United States Patent [19]

Hu et al.

[11] Patent Number: 5,463,010

[45] Date of Patent: Oct. 31, 1995

[54] HYDROCYCLOSILOXANE MEMBRANE PREPARED BY PLASMA POLYMERIZATION PROCESS

[75] Inventors: Chen-Ze Hu; Eric K. Dolence, both of Salt Lake City; Shigemasa Osaki, Sandy; Clifton G. Sanders, Salt Lake City, all of Utah

[73] Assignee: Surface Engineering Technologies, Division of Innerdyne, Inc., Salt Lake City, Utah

[21] Appl. No.: 152,176

[22] Filed: Nov. 12, 1993

[51] Int. Cl.⁶ ............................. C08G 77/06; C08G 77/12
[52] U.S. Cl. ............................. 528/25; 528/31; 528/28; 528/32; 204/165; 427/489; 428/447
[58] Field of Search .................... 528/31, 25, 28, 528/32

[56] References Cited

U.S. PATENT DOCUMENTS

| | | | |
|---|---|---|---|
| 4,332,922 | 6/1982 | Kossmehl et al. | 525/478 |
| 4,781,942 | 11/1988 | Leyden et al. | 427/54.1 |
| 4,913,831 | 4/1990 | Todd, Jr. et al. | 252/70 |
| 5,298,536 | 3/1994 | Babcock et al. | 523/201 |

OTHER PUBLICATIONS

Zeigler et al. *Silicon–Based Polymer Science, A Comprehensive Resource*, 1990 pp. 732–733.
A. M. Wrobel et al. *J. Macromol Sci–Chem*, "Thermal Decomposition of Plasma Polymerized Organosilicon Thin Films" pp. 433–452 (1982).
I. H. Coopes and H. J. Griesser, *Journal of Applied Polymer Science*, vol. 37, 3413–3422 (1989).

*Primary Examiner*—John C. Bleutge
*Assistant Examiner*—Margaret W. Glass
*Attorney, Agent, or Firm*—Lyon & Lyon

[57] ABSTRACT

Plasma polymerized membranes comprising polymerized aliphatic hydrocyclosiloxane monomers optionally copolymerized with co-monomers and methods for their preparation are described. These methods may be used to coat substrates to impart properties such as hydrophobicity, thromboresistance, gas permeability and biocompatibility.

37 Claims, 30 Drawing Sheets

HYDROCYCLOSILOXANE MEMBRANE PREPARED BY PLASMA POLYMERIZATION PROCESS

FIELD OF THE INVENTION

This invention relates to compositions for coating substrate surfaces to inure them with low friction and hydrophobic properties without affecting bulk material properties. More particularly, the invention relates to membrane coatings suitable for gas or liquid barriers, optical waveguides, lubricants, insulating layers, protective coatings, biocompatible coatings, or gas diffusion membranes, particularly for use in conjunction with biomedical devices.

BACKGROUND AND INTRODUCTION TO THE INVENTION

In order to be suitable for a particular use, a substrate often needs to be adapted to a particular environment by changing its character, for example, inuring it with properties such as biocompatability, specific gas permeability, or a low friction coefficient, without significant alteration of the underlying substrate.

Biomedical devices such as catheters, oxygenators, grafts, and stents require biocompatability. These devices are used to provide inter alia drug delivery, gas exchange, or mechanical support to various portions of the human or animal body. In their normal application, such devices are expected to function in intimate contact with living tissue and blood. This interface creates a delicate balance between ensuring that the device can function in the complex extra- and intra- cellular environment and maintaining the living tissues and blood. By use of the compositions of the present invention devices, which might otherwise be rejected by living tissue, are rendered biocompatible, that is, acceptable and functional within a human or animal body.

1. Thrombus Formation Results In The Occlusion Of Biomedical Devices

Thrombus formation, the formation of a blood clot, may be a serious and potentially debilitating response to synthetic substrates in contact with blood or tissue. When blood or tissue contacts the substrate surface, proteins in the blood or tissue may be adsorbed by the surface.

The initial protein layer of the blood/substrate interface is subject to denaturation, replacement, and further reaction with blood components. The composition and conformation of the adsorbed proteins may influence the occurrence of subsequent cellular responses such as platelet adhesion, aggregation, secretion, and complement activation. Adsorbed fibrinogen may be converted to fibrin, the fibrous insoluble protein that forms the structure of a thrombus. Fibrin formation is accompanied by adherence of platelets and possibly leukocytes. The platelets are activated and release the contents of their granules, resulting in activation of other platelets, and ultimately resulting in platelet aggregation.

A thrombus eventually forms from entrapment of platelets, erythrocytes and other blood constituents in the growing fibrin network. Thrombus growth can lead to partial or total blockage of the device. Additionally, the thrombus may be sheared off or lysed, or otherwise released from the substrate as an embolus, a mass of particulate matter. Unfortunately, emboli can be as dangerous as device blockage. Emboli can travel throughout the bloodstream and lodge in vital organs, thus, causing infarction, the localized death of tissue due to the obstructed blood flow. Infarction of the heart, lungs, or brain can be fatal.

Long term use of most polymeric substrates has inevitably resulted in mechanical failure, the promotion of blood clot formation, or physical degradation due to unfavorable interactions with tissue or blood environment. P. Vondracek, et al., "Biostability of Medical Elastomers: A Review," Biomaterials, 5:209–214 (1984); D. F. Williams, "Biodegradation of Surgical Polymers," J. Natr. Sci., 17:1233–1246 (1982). The present invention plays an important role by inhibiting thrombus formation, embolization, and protein denaturation, thereby allowing biomedical devices made from numerous different substrates to be useful, functioning tools.

2. Biomedical Devices Are Frequently Subject To Degradation Due To The Nature Of The Working Environment Most biomedical devices are manufactured from polymeric substrates. As a result, they are susceptible to degradation. D. K. Gilding, "Fundamental Aspects of Biocompatability," Vol. I, ed. D. F. Williams, CRC Press, Boca Raton, Fla. (1981). There are any number of ways in which degradation may occur. The substrate may be susceptible to hydrolysis. Polymeric devices in contact with aqueous extracellular fluid are particularly susceptible to degradation by hydrolysis when the polymer is hydrophilic, contains hydrolytically unstable bonds, and the pH remains around 7.4. Substrates with soft silicon coatings may be susceptible to leaching into the surrounding tissues.

3. To Date There Have Been No Safe Long Term Methods For Altering The Substrate Characteristics To Adapt To The Working Environment Device failure is both costly and hazardous to human life. Thus, a variety of measures have been attempted to avoid these problems. Systemic anticoagulants, such as heparin and warfarin, have been directly administered to the subject having the device in order to combat thrombosis; however, such anticoagulant therapy has a risk of hazardous side effects. Moreover, overdoses of anticoagulants may cause lethal side reactions, such as visceral or cerebral bleeding. Other measures involve regular flushing of silicon and polyurethane catheters with heparinized saline or frequent replacement of the implanted catheters before thrombosis occludes. Such measures are both time consuming and expensive.

Pyrolytic carbon coatings have been used successfully in conjunction with long term implants such as artificial heart valves. Haubold, A. D., et al., "Carbon Biomedical Devices" in *Biocompatability of Clinical Implant Materials*, Vol. II, CRC Press, Boca Raton, 3–42 (1981). The pyrolytic carbon thinly coated on the artificial heart valves has been shown to function in the human body for as long as ten years without major complications. Unfortunately, in order to coat biomedical devices with pyrolytic carbon, the surface of the substrate to be coated must be able to withstand temperatures above 900° C. Most polymeric materials suitable for biomedical devices decompose at temperatures above 400° C.

Substrate surfaces have been coated via adsorption of hydrophilic or segmented hydrophilic/hydrophobic polymers to minimize protein adhesion and platelet adhesion/activation.

4. Thromboresistance and Biocompatibility Are Often Only The First In A Long List Of Required Characteristics.

For certain uses other properties are required besides substrate biocompatibility or thromboresistance. The specific requirements of each device may vary in accordance to the degree and duration of contact and the nature of the application. Oxygenators, for example, require superior gas permeability. These devices facilitate the exchange of oxygen and carbon dioxide by transferring oxygen from the inner lumen of a polypropylene or polyethylene microporous fiber through the cross section, via microporous holes, into the blood at the fiber/blood interface. Plasma leakage through the microporous membranes of conventionally used oxygenators, (such as Sarns, model 16310N3; Medtronic Maxima and Minimax) has been reported after prolonged exposure to blood and has been thought to be associated with serum triglyceride levels. Adsorption of bipolar plasma molecules such as phospholipids on the hydrophobic microporous membrane has been thought to form a hydrophilic layer over the hydrophobic membrane surface leading to surface wetting and plasma leakage through the microporus membrane. See J. Patrick Montoya, et al., ASAIO J., M399–M405 (1992). Usually within a few hours of exposure to blood, the plasma leakage through the microporous membrane will drastically reduce the gas transfer ability of the oxygenator. At that point the whole device must be discarded and replaced in order to avoid serious consequences to the patient.

Artificial vision or hearing implant devices require substrates with insulating properties. The liquid saline environment is highly corrosive to metals, which, being under electrical bias, are subject to rapid failure due to electrochemical reactions. Furthermore, most polymeric substrates suitable for these devices are subject to an incompatible interface between the polymer and the silicon electrode surface. Yamamoto, M. et al, Applied Polymer Science, 29:2981 (1984). The membrane coating of the present invention provides the substrate with the necessary insulating properties. In addition, the membrane provides excellent interfacial adhesion with metal (FIG. 18) and silicon substrates, rendering them ideal for protective, insulating coatings and biocompatible coatings.

It is clear from the foregoing that biocompatible blood or tissue contacting surfaces comprise an urgently need in the biomaterials industry to counteract a wide variety of blood or tissue/material incompatibility reactions. A number of the embodiments of the present invention foster biocompatability of all substrate surfaces. Other embodiments will capitalize on altering substrate characteristics to harmonize with their environment.

SUMMARY OF THE INVENTION

The present invention is directed to a membrane material comprised of aliphatic hydrocyclosiloxane monomers of the general formula:

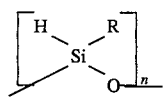

wherein n is an integer from 2 to about 10 and R is an alkyl group of 1 to about 5 carbon atoms or mixtures of these aliphatic hydrocyclosiloxane monomers and other selected monomers such as reactive functionalizing monomers, organo-based monomers, or fluorocarbons monomers.

By altering the ratios of the co-monomers to the monomers, the physical properties, such as insulating properties, and the chemical properties, such as hydrophobicity, thromboresistance, gas permeability, and biocompatibility of the membrane can be adjusted to fit individual requirements of a substrate. The ultra-thin membrane of the present invention is covalently bonded to the polymeric substrate surface and the membrane structure is a highly cross-linked three dimensional molecular network. Thus, a device coated with the disclosed membrane is resistant to organic solvents and water or saline solution. Furthermore, it can prevent the impurities or unreacted monomer from the device from leaching into the surrounding tissues.

The membrane coating of the present invention can be applied to the polypropylene or polyethylene microporous fibers to protect against plasma leakage and maintain gas permeability. Thus, the instant invention provides gas permeability, improved biocompatibility, and slowed degradation of the microporous fibers in the blood oxygenator. This membrane coating provides a uniform, pinhole free and ultra-thin siloxane biocompatible, thromboresistant, insulating, gas permeable membrane suitable for virtually any substrate surface. The foregoing, and other features and objects of the present invention, are realized in the compositions described and claimed herein.

Definitions

The following terms are defined as follows for the purposes of this disclosure:

Thromboresistance: resistant to the formation of blood clots.

Biocompatibility: performs in harmony with living tissue and/or blood.

Insulating Properties: properties of significant electronic resistivity or non-electronic conductivity.

Hydrophobic: predominant lack of affinity for water.

Hydrophilic: predominant affinity for water.

Plasma Polymerization: The formation of polymeric materials under the influence of plasma (consisting of ionized gases, free radicals and electrons).

Plasma Copolymerization: plasma polymerization of a mixture of different monomers.

Etching or Ablation: physical or chemical treatment of a surface involving chemical bond cleavage and resulting in the net removal of atomic or molecular species.

Plasma Glow Zone: The region in which the glow discharge in the plasma polymerization process takes place.

BRIEF DESCRIPTION OF THE DRAWINGS

FIG. 3A depicts the FTIR spectrum of 1,3,5,7-tetramethylcyclotetrasiloxane (TMCTS) monomer and FIG. 3B depicts the FTIR of TMCTS plasma polymerized membrane.

FIG. 9A depicts the ESCA spectrum for carbon 1s. FIG. 9B depicts the ESCA spectrum for oxygen 1s. FIGS. 9C depicts the ESCA spectrum for silicon 2p.

FIG. 10A depicts the ESCA spectrum for carbon 1s. FIG. 10B depicts the ESCA spectrum for oxygen 1s. FIG. 10C depicts the ESCA spectrum for silicon 2p.

FIG. 11A depicts the ESCA spectrum for carbon 1s. FIG. 11B depicts the ESCA spectrum for oxygen 1s. FIG. 11C depicts the ESCA spectrum for silicon 2p. FIG. 11D depicts the ESCA spectrum for fluorine 1s.

FIG. 12A depicts the ESCA spectrum for carbon 1s. FIG. 12B depicts the ESCA spectrum for oxygen 1s. FIG. 12C depicts the ESCA spectrum for silicon 2p.

FIG. 13A depicts the ESCA spectrum for carbon 1s. FIG. 13B depicts the ESCA spectrum for oxygen 1s. FIG. 13C depicts the ESCA spectrum for silicon 2p. FIG. 13D depicts the ESCA spectrum for nitrogen 1s.

FIG. 14A depicts the ESCA spectrum for carbon 1s. FIG. 14B depicts the ESCA spectrum for oxygen 1s. FIG. 14C depicts the ESCA spectrum for silicon 2p. FIGS. 14D depicts the ESCA spectrum for nitrogen 1s. FIG. 14E depicts the ESCA spectrum for sulfur 2p.

FIG. 16A depicts gas permeability for membrane prepared at 10 cm/s fiber coating speed. FIG. 16B depicts gas permeability for a membrane prepared at 6.3 cm/s fiber coating speed.

FIG. 18A depicts the fiber before, and FIG. 18B depicts the fiber after depositing a plasma polymerized TMCTS membrane.

FIG. 19A depicts a surface view, and FIG. 19B depicts a cross-section view.

DETAILED DESCRIPTION OF THE INVENTION

The present invention concerns the formation and use of a aliphatic hydrocyclosiloxane membrane designed to inure a variety of substrate surfaces with gas permeable, biocompatible, low friction or insulating characteristics. It is suitable for virtually any device requiring these characteristics—including biomedical devices, automobile parts, and electronic devices.

The membrane is formed through plasma polymerization of suitable aliphatic hydrocyclosiloxane monomers or plasma copolymerization of aliphatic hydrocyclosiloxane monomers and co-monomers depending on the necessary characteristics. Aliphatic hydrocyclosiloxane monomers have the general formula:

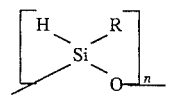

wherein R is alkyl group of 1 to about 5 carbon atoms and n is an integer from 2 to about 10. Monomers include those where n is 7 to 10, where n is 4 to 6 and where n is 2 to 3. Co-monomers such as fluorocarbons, organo-based monomers, or functional group terminated monomers can be utilized to change the properties of the membrane to adjust for varied applications.

1. The membrane is applied to the substrate surface through a process of plasma state polymerization The monomers are polymerized directly on the substrate surface using plasma-state polymerization techniques.

The general process of plasma-state polymerization is known to those in the art. See Yasuda, *Plasma Polymerization*, Academic Press Inc., New York (1985), incorporated herein by reference.

In brief, monomers may be polymerized onto a substrate surface by activating the monomer into a gaseous complex, composed of electrons, ions, gas atoms, free radicals, and molecules in the excited states, known as the plasma state. The plasma state generates highly reactive species, which forms the characteristically highly cross-linked and highly-branched, ultra-thin polymer membrane, which is deposited on the substrate surface as it moves through the area of most intense energy density, known as the plasma glow zone.

Figure 18A:
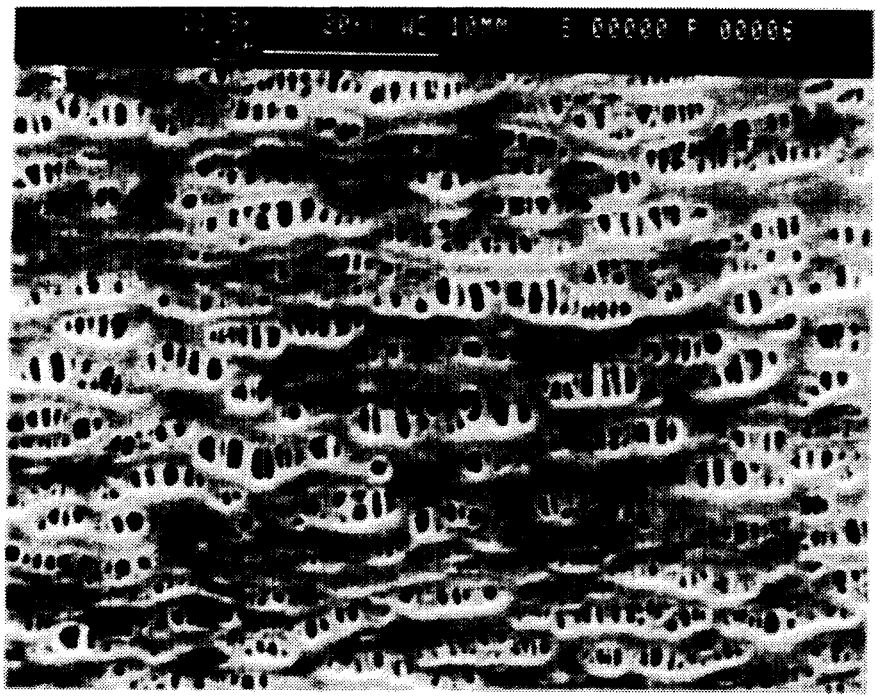
FIGS. 18A and 18B depict a Scanning Electron Microscope (SEM) picture of a polypropylene microporous hollow fiber (MITSUBISHI KPF-190 fiber).
Figure 18B:
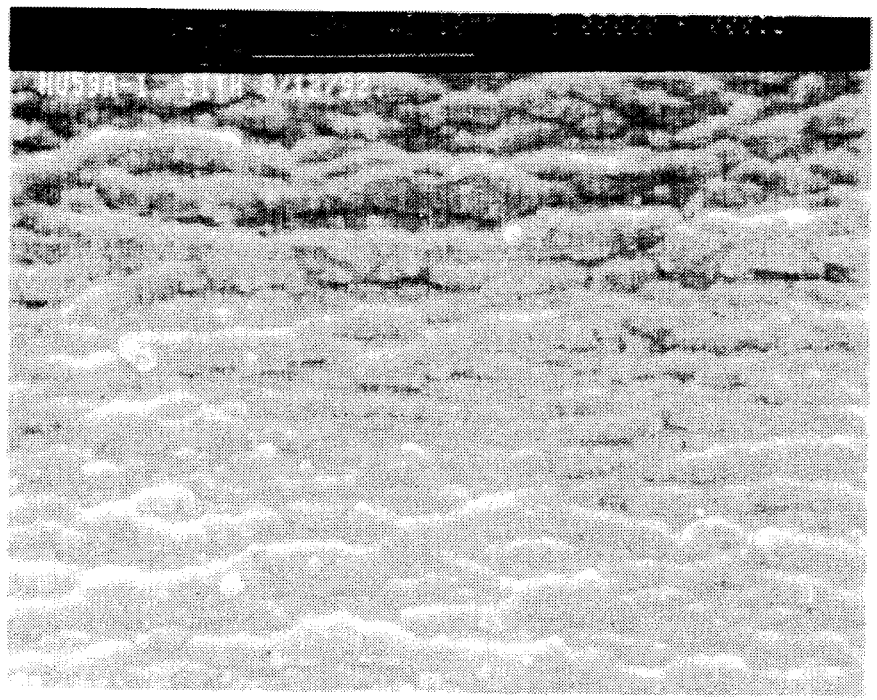
Figure 19A:
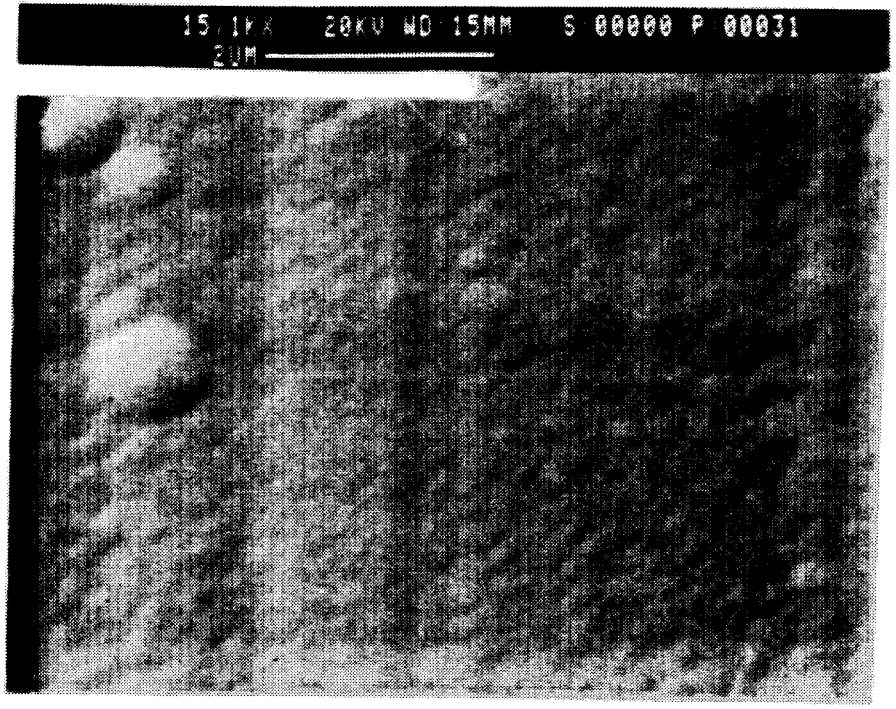
FIGS. 19A and 19B depict SEM pictures of plasma polymerized TMCTS membrane on platinum wire surface.
Figure 19B:
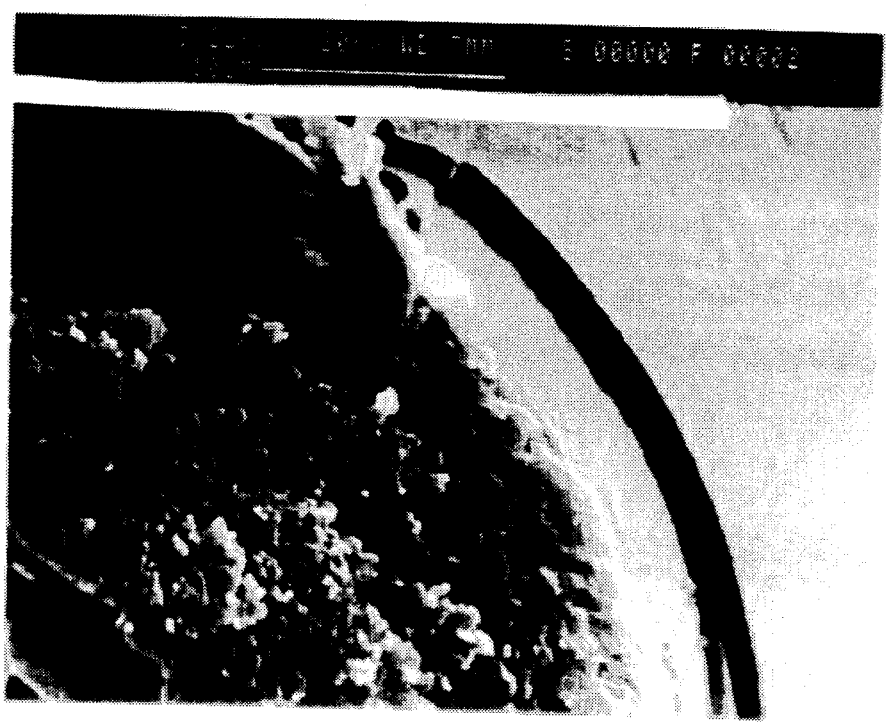

In practice, an electric discharge from a radio frequency (R.F.) generator is applied to the "hot" electrodes of plasma reactor. The selected monomers are introduced into the reactor and energized into a plasma, saturating the plasma glow zone with an abundance of energetic free radicals and lesser amounts of ions and free electrons produced by the monomers. As substrate material passes through or remains in the plasma glow zone, the surface of the substrate is continually bombarded with free radicals, resulting in the polymerized membrane coating. Examples of substrates include silicon catheter, metal wire (FIGS. 19A and 9B) and fibers (FIGS. 18A and 18B). The plasma-state polymerized hydrocyclosiloxane membrane is highly adhesive to most organic and inorganic substrates, providing a smooth, hard, pinhole-free membrane coating.

There are two types of commercially available plasma-state polymerization systems: (a) capacitively coupled internal parallel electrodes, such as Bell Jar reactors, and (b) R.F. coil-inductively coupled tubular reactors. However, without modification, these systems are not suitable for producing the uniform single-phase membranes at high enough deposition rates for processing large quantities of substrate. These systems are more suitable for controlled etching of substrate surfaces.

Modifications of the monomer flow rate and flow path are critical to obtaining the necessary high deposition rates of plasma polymerized membrane on substrate surfaces. The most serious shortcoming of the above-mentioned commercial systems is their inability to control the monomer flow to the region between the electrodes. This inability renders it impossible to achieve uniform plasma density, plasma composition, or deposition rate between the electrodes. Furthermore, because the monomer is not confined to the electrode region, the flow rate between the electrodes is significantly decreased. In addition, because of the undirected monomer flow, oily and powder deposits of plasma polymerized monomers form throughout the plasma chamber. These deposits can be eliminated by restricting the flow path in the reactor chamber to the space between the electrodes, maintaining deposition solely in the plasma glow zone.

2. The Plasma Polymerization Process

When the plasma glow zone is activated, the monomer or monomer mixture is continually passed through the plasma glow zone and the unused monomer or monomer mixture condenses in the cold trap.

During the plasma coating process, the substrate experiences both thermal and ultra-violet (UV) radiation. The heat generated can be removed by the external fans constantly blowing onto the system. The heat generated by electrons, ions, or free radicals colliding with the substrate surface is insignificant and will not effect the bulk mechanical properties of the substrate. The total energy released as heat or mechanical energy after impact is relatively small but the surface of the substrate may become chemically active and unstable.

The UV radiation generated from the plasma process is especially harmful to polymeric substrates such as polypropylene or polyethylene hollow fiber. The UV radiation will penetrate through the surface of the polymeric substrate, breaking the fiber polymer chains. This is known as chain scission. The polymer chains may subsequently recombine. If polymer chain scission is the dominant process, the fiber's mechanical strength will be weakened. If the polymer chain recombination is the dominant process, the polymer units will form local cross-linked network structures, and the bulk polymer will lose ductility and become brittle. The intensity of the plasma glow zone, the substrate residence time in the plasma glow zone, and the substrate pulling tension need to be controlled carefully in order to minimize the plasma-induced damage to the polymeric substrate.

The relationship between the plasma intensity, free radical concentration, and system pressure is complex. The plasma coating parameter formula, W/FM, where W is the R.F. power, F is the monomer flow rate, and M is molecular weight of the monomer (see Yasuda, H., *Plasma Polymerization*, Academic Press, 1985) fails to address two important factors: system pressure and the plasma reactor geometry. The system pressure will affect the mean free path of the plasma-activated species, such as free radicals, ions, and electrons. When the system pressure increases, the mean free path of the plasma activated species decreases; and powder, rather than the uniform membrane coating, will form in the gas phase and be deposited On the substrate surface. The W/FM parameters also will change when the geometry of the plasma reactor changes. Therefore, W/FM can be a useful plasma coating parameter only if the system is maintained at constant pressure and only if the same plasma reactor geometry is utilized.

Figure 20:
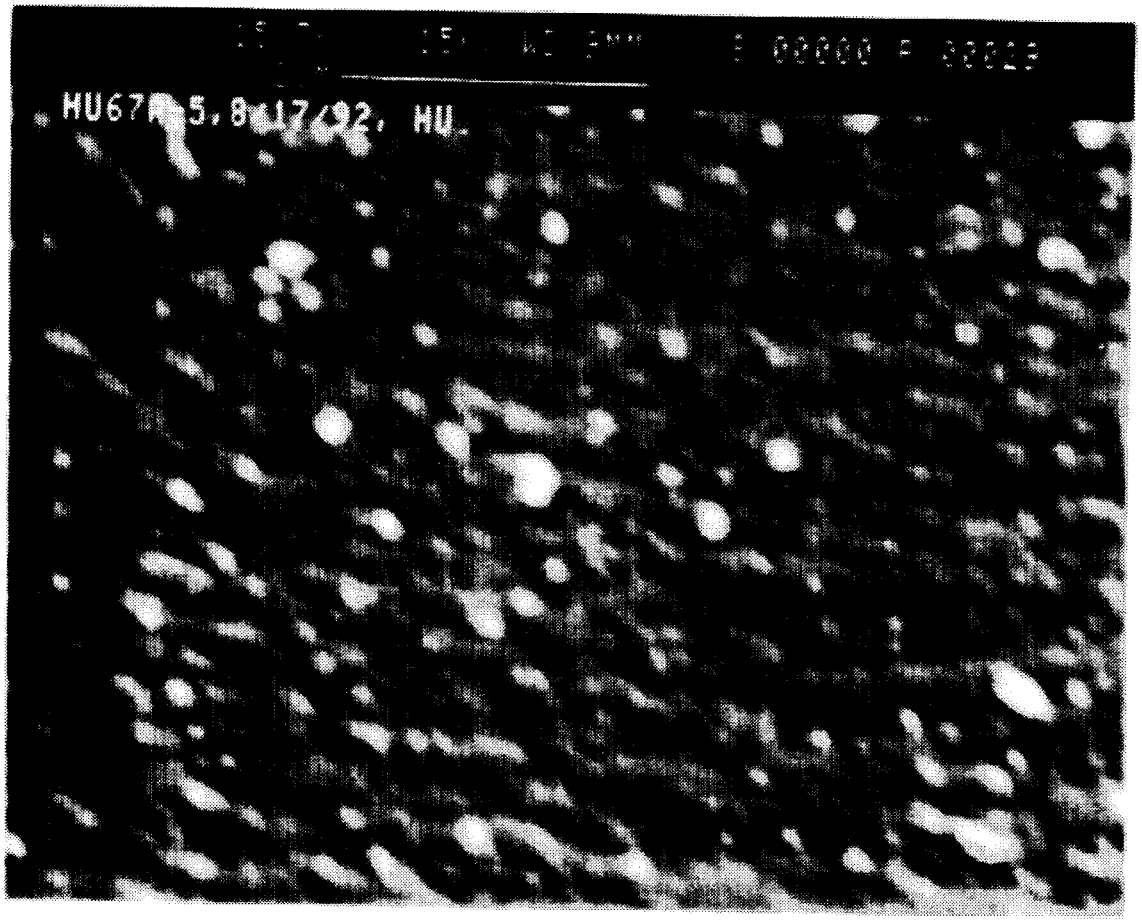
FIG. 20 depicts a SEM picture of two-phase morphology TMCTS plasma polymerized membrane on polypropylene microporous hollow fiber (MITSUBISHI KPF-190 fiber).

A plasma coating system with the same reactor geometry can be used if the W/FM formula is employed as a control indicator. If the system is controlled at a given pressure, increasing W and decreasing F will likely result in etching or ablation of the substrate surface. If W is decreased and F is increased, the desired coating will most likely result. At a given W and F, if the system pressure increases above a given pressure, the resulting membrane is no longer homogenous. For example, when a polypropylene microporous hollow fiber (Mitsubishi KPF-190 fiber) is coated at 40 W in R.F. power, 4.2 μmole/s TMCTS flow rate, 10.5 cm/s coating speed, and a pressure above 85 mtorr, a two-phase morphology membrane will start to appear. (See FIG. 20).

Figure 21:
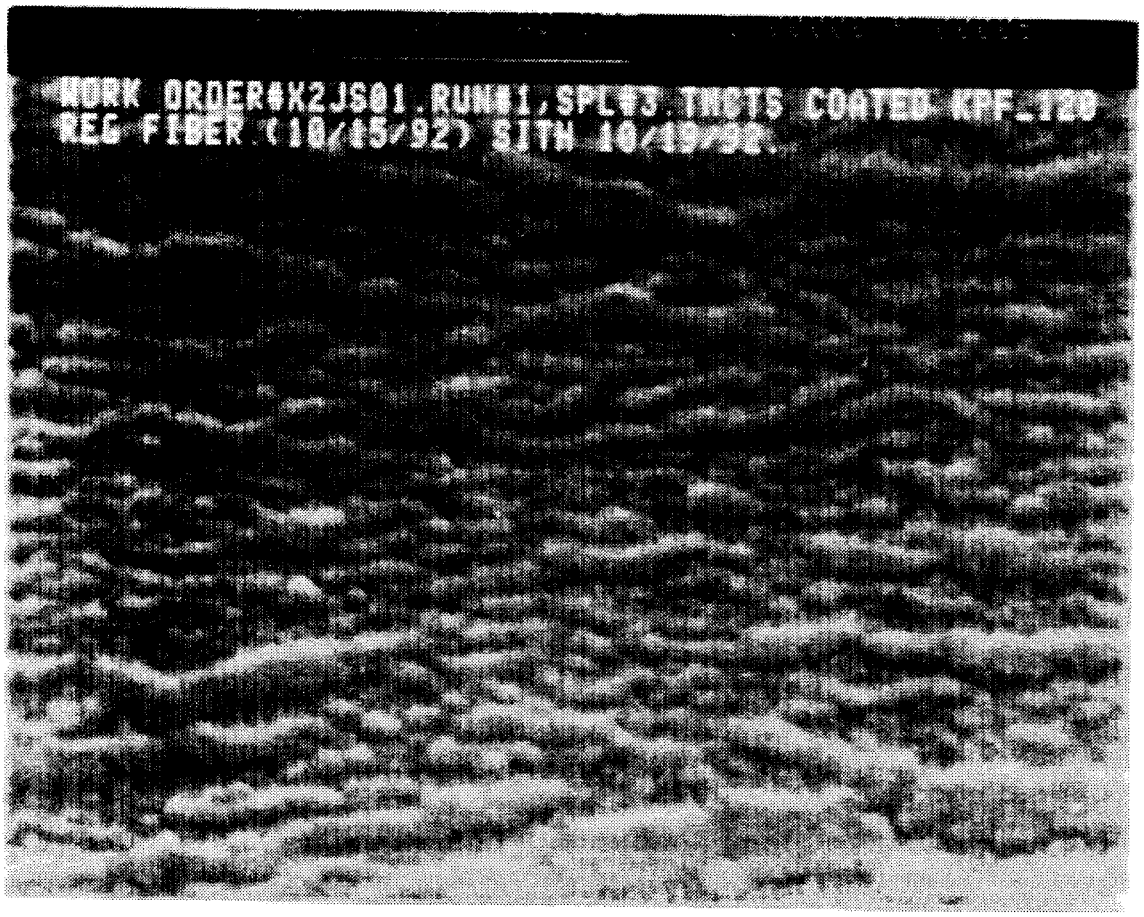
FIG. 21 depicts a SEM picture of homogeneous TMCTS plasma polymerized membrane on polypropylene microporous hollow fiber (MITSUBISHI KPF-120 fiber).

This two-phase phenomenon is caused by an increase in the system pressure which decreases the mean free path of monomer free radicals and results in the monomer free radicals recombining in the gas phase before reaching the substrate surface. This in turn results in deposition of plasma polymerized siloxane powder along with polymerization of free radicals on the substrate surface, resulting in the two-phase membrane. In general a high flow rate (about 5 μmole/sec), moderate R.F. power (about 80 W), and low system pressure (about 40 mtorr) will produce a suitable homogeneous siloxane membrane at a high deposition rate (about 0.25 μ/sec). For example, a polypropylene microporous hollow fiber (Mitsubishi KPF-120 fiber) coated at 100 W in R.F. power, 5.7 μmole/s TMCTS flow rate and 19.0 cm/s coating speed shows a homogeneous siloxane membrane at a high deposition rate using System I (See FIG. 21).

In order to analyze the chemical and physical properties of the described membrane, the clean silicon (Si) chip is inserted into the plasma coating systems to obtain the disclosed membrane for further analysis.

A. System I—FIG. 1

Figure 1:
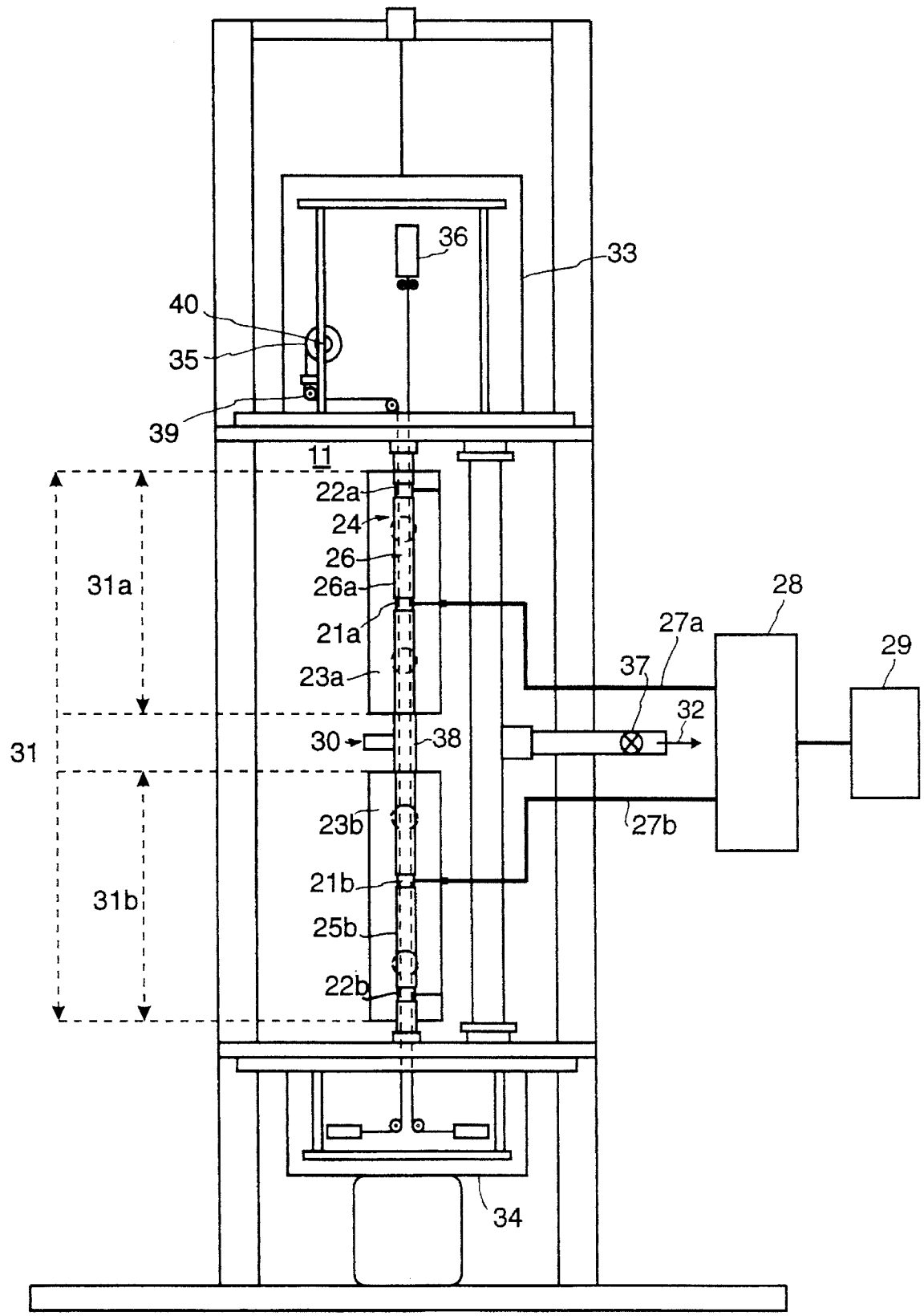
FIG. 1 depicts an overview diagram of an external electrode continuous type plasma coating system I.

FIG. 1 depicts a preferred plasma coating system (System I). System I is a capacitively coupled external electrode R.F. plasma system suitable for the continuous production of the present membrane coatings. It is primarily designed for small substrates, such as fibers and catheters. By carefully controlling system parameters such as pressure, temperature, R.F. power, monomer flow rate, glow zone geometry, and the residence time of the substrate in the glow zone, System I can coat substrates moving through the glow zone with a thin, uniform, and chemically homogeneous aliphatic hydrocyclosiloxane plasma polymerized membrane.

Chamber 33 contains fiber or material 26 supply spool 35, take-up spool 36, pulleys 39, clutches 40, and coating speed control system 41. Chamber 34 contains pulleys for fiber or material to return to the take-up spool 36 located in chamber 33.

The fiber or material 26 is wound onto the supply spool 35. The lead end of the fiber or material 26 is tied to the supply spool 35 with fifteen turns of guide thread. A loop is formed around the take-up spool 36, through chamber 34, and supply spool 35 with the aid of the guide thread. Thus, the fiber or material 26 passes through the plasma glow zone 31, through chamber 34, back through the plasma glow zone 31, and is wound up on take-up spool 36.

After the system has been pumped down and has reached the steady state, the flow of the monomer or monomer mixture is initiated at the monomer inlet port 30, passes through the reactor housings 25a and 25b, and is continuously pumped out through the outlet port 32.

The reactor housings 25a and 25b, can be formed using any material with sufficient resistance to withstand the plasma polymerization reaction conditions, such as Pyrex™ glass tubes, with R.F. electrodes 21a and 21b attached to the exterior surface. The housings 25a and 25b accommodate the plasma glow zone 31. The plasma glow zone 31 is activated between the "hot" electrode 21a and the ground electrode 22a and between the "hot" electrode 21b and the ground electrode 22b. The system pressure is controlled by the pressure control valve 37.

When the fiber or material 26 enters the plasma glow zone 31, it is bombarded by free radicals and the membrane is polymerized on the surface of the fiber or material 26. The proper supply spool 35 clutch tension and the proper coating speed must be set with great caution to ensure proper coating performance. For example, when using polypropylene microporous hollow fibers, the proper supply spool 35 clutch torque for Mitsubishi KPF-190 and -250 fibers is 4 grams and for Mitsubishi KPF-120 fiber is 2 grams.

The R.F. system, which provides the power to maintain the monomers in the plasma state, includes the R.F. power supply 29, R.F. cable 27a and 27b, the R.F. matching network 28, and R.F. electrodes 21a, 21b, 22a, and 22b attached to the reactor housing 25a and 25b. The R.F. power cable 27a and 27b is split in two after R.F. matching network, cable 27a connects to "hot" electrode 21a and cable 27b connects to "hot" electrode 21b. Ground electrodes 22a and 22b carry the returning R.F. current to the R.F. power supply ground and are connected to R.F. Shield boxes 23a and 23b. Both the power and ground electrodes are made of 1 inch wide copper tape. The cooling fans 24 are mounted on the R.F. Shield boxes 23a and 23b, and provide constant cooling to the plasma glow zone.

Figure 2:
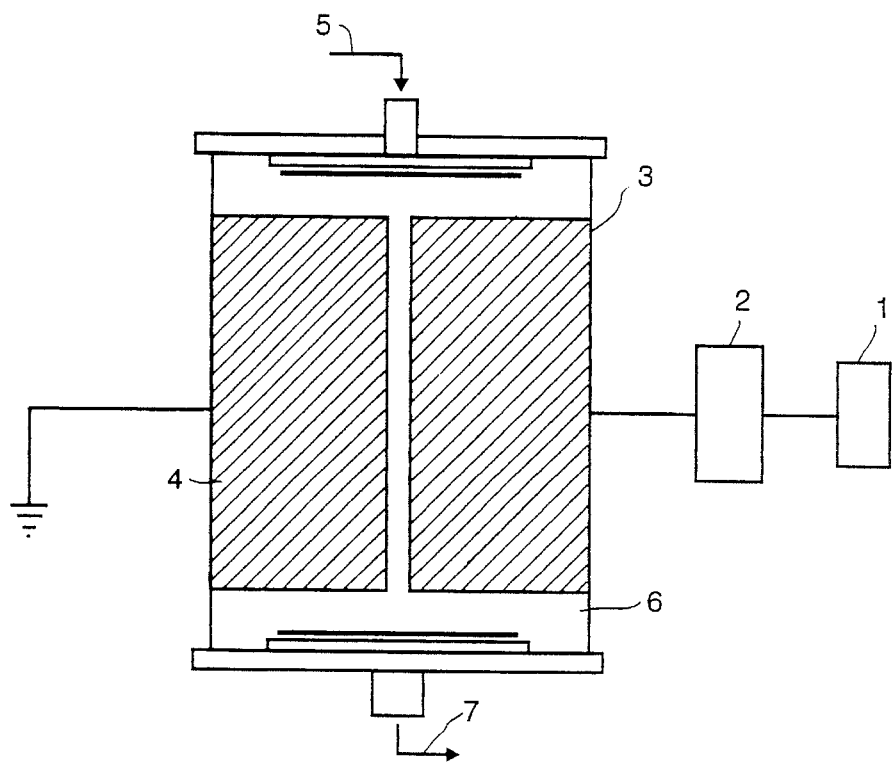
FIG. 2 depicts an overview diagram of an external electrode batch type plasma coating system II.

B. System II—FIG. 2

The plasma coating system II (FIG. 2) is a batch type plasma coating system and is used for coating larger size substrate.

The plasma coating system II is designed to coat larger or odd-shaped substrates in a batch process. This system ("System II") was also developed based on the concept of restricted monomer flow path (the monomer or monomer mixtures will only flow through the space in between the electrodes). Plasma coating system II consists of R.F. power supply 1, matching network 2, "hot" electrode 3, ground electrode 4, monomer inlet 5 and monomer outlet 7.

3. Preferred Membrane Coatings

Aliphatic hydrocyclosiloxane monomers may be used to create a homogeneous membrane or aliphatic hydrocyclosiloxane monomers and co-monomers may be mixed to give membrane coatings having properties different from the properties of a homogenous membrane prepared using aliphatic hydrocyclosiloxane monomers. For example, by introducing reactive functionalizing monomers, or organo-based monomers, or fluorocarbon monomers together with the aliphatic hydrocyclosiloxane monomers in the plasma polymerization system, physical membrane pore size and chemical affinity of the plasma copolymerized aliphatic hydrocyclosiloxane membrane with selective monomers can be controlled. This allows use of the copolymerized plasma membrane for applications which require the membrane to differentiate between certain types gases, ions, and molecules. Furthermore, the membrane can be used to alter the substrate pore size while maintaining the same chemical affinity, allowing its use in reverse osmosis, ultrafiltration and microfiltration applications.

By controlling the mole ratio of the functionalizing monomers, the polymer matrix pore size can be altered, thus allowing systematic change of the chemical structure and physical properties of the siloxane copolymer plasma polymerized membrane. This allows this membrane to be used as a diffusion membrane. This use entails using the membrane as a matrix in which a solute such as electrolytes for use in thin solid state batteries or drugs for controlled release drug delivery systems can be entrained.

The following four different types of plasma polymerized aliphatic hydrocyclosiloxane membranes (Types A–D) represent useful embodiments of the invention.

Figure 16A:
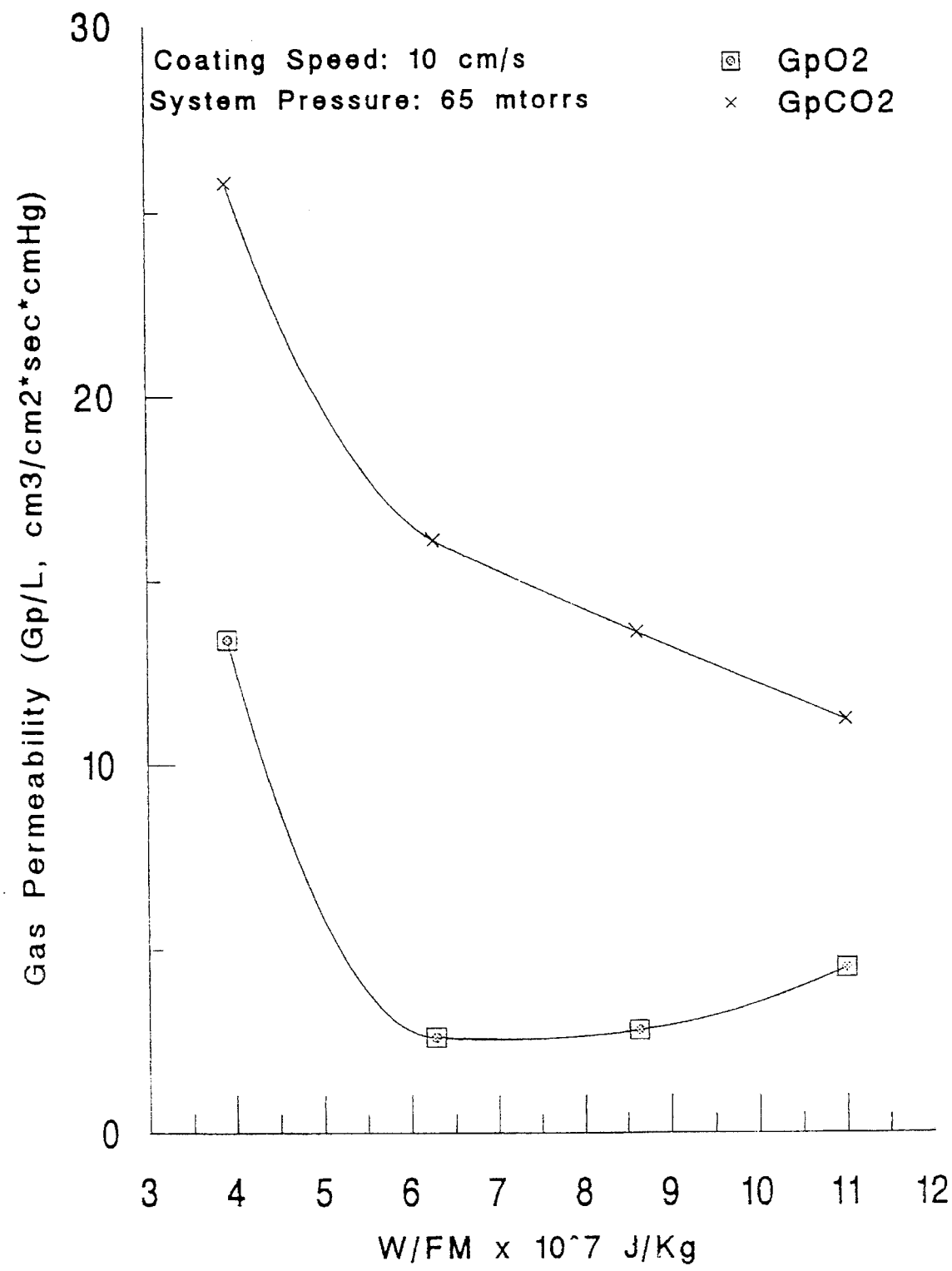
FIGS. 16A and 16B depict the gas permeability of TMCTS plasma polymerized membrane on polypropylene microporous hollow fiber (MITSUBISHI KPF-190 fiber).
Figure 16B:
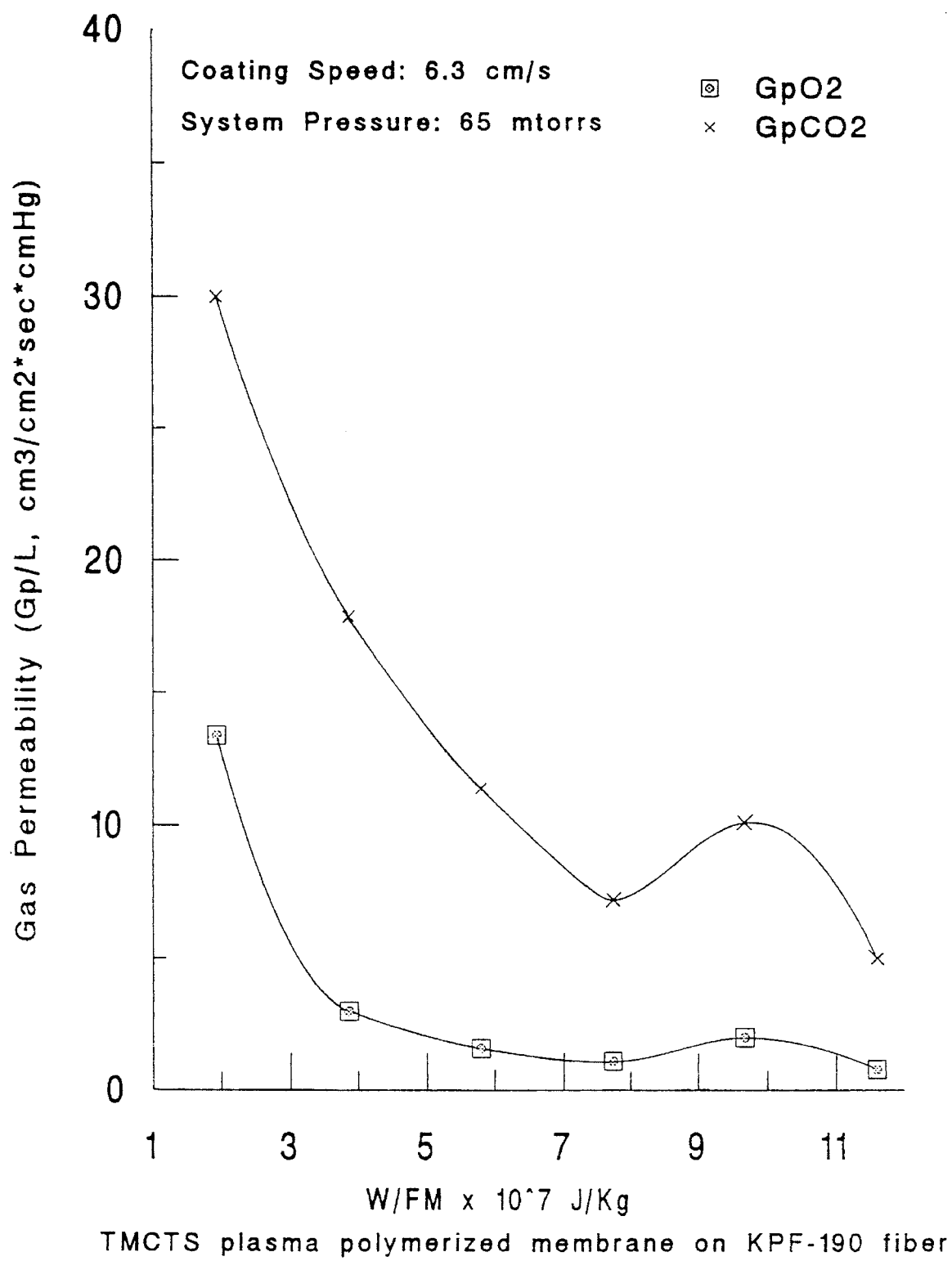
Figure 17:
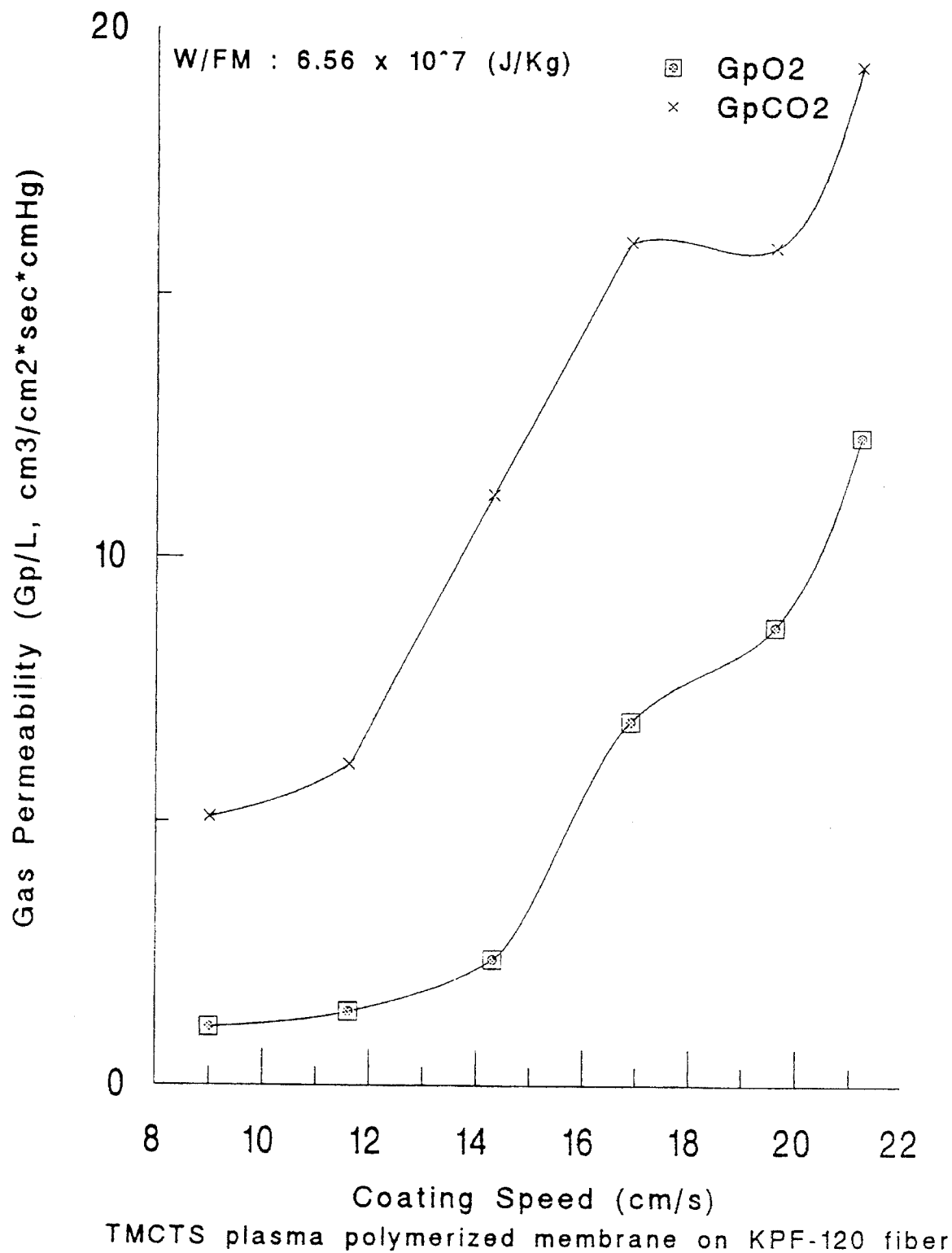
FIG. 17 depicts a plot of gas permeability of TMCTS plasma polymerized membrane on polypropylene microporous hollow fiber (MITSUBISHI KPF-120 fiber) versus the fiber coating speed.

"Type A" refers to membrane coatings which are deposited on the substrate surface through the plasma state polymerization process using aliphatic hydrocyclosiloxane monomers of the general formula:

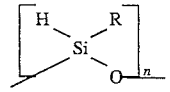

where R is an aliphatic group and n is an integer from 2 to about 10, preferably 4 to 6. Preferred aliphatic hydrocyclosiloxane monomers include: 1,3,5,7 -tetramethylcyclotetrasiloxane ("TMCTS"); 1,3,5,7,9 -pentamethylhydrocyclopentasiloxane ("PMCTS"); 1,3,5,7,9,11-hexamethylhydrocyclohexasiloxane ("HMCHS") and a mixture of 1,3,5,7,9-pentamethylcyclopentasiloxane and 1,3,5,6,9,11-hexamethylcyclohexasiloxane monomers ("XMCXS"). Use of a radio frequency power greater than 5 W, a system pressure less than 300 mtorrs, and a monomer flow rate greater than 1μ μmole/s, will cause a homogeneous (See FIGS. 18A and 18B), hard, hydrophobic (See Table 1), a biocompatible (See Table 2), gas permeable (See FIGS. 16A, 16B, 17, and See Table 3) membrane with a low friction coefficient and insulating properties (See Table 4) to form on the substrate surface passing through the plasma glow zone. These membrane coatings may have an oxygen permeation rate from 0.4 to 20 ($\times 10^{-4}$ cm³/cm²*sec*cmHg), a $CO_2$ permeation rate from 1 to 50 ($\times 10^{-4}$ cm³/cm²*sec*cmHg and $CO_2/O_2$ selectivity between 1.5 and 7.

"Type B" refers to membrane coatings which are produced by plasma co-polymerization process of mixtures of the same aliphatic hydrocyclosiloxane monomers used in Type A membrane coatings and fluorocarbon monomers. Suitable fluorocarbon monomers would include $CF_4$, $C_2F_6$, $C_3F_6$, $C_3F_8$, $C_2F_4$, hexafluoropropene, perfluorobenzene, ditrifluoromethylbenzene, perfluoro-2-butyltetrahydrofuran, and pentafluorostyrene. The linear alkyl-type fluorocarbon monomers should have C/F ratio greater than ¼, for example, $C_3F_6$. If the C/F ratio is below ¼, etching usually occurs in the plasma polymerization process.

"Type C" refers to membrane coatings which are produced by plasma co-polymerization process of mixtures of the same aliphatic hydrocyclosiloxane monomers used in Type A membrane coatings and organo-based monomers. Suitable organo-based monomers would include ethylene, allylamine, and N-trimethylsilylallylamine, hydrocarbons, unsaturated amines (both N-protected and N-unprotected), cyclic aliphatic amines (both N-protected and N-unprotected), mercaptans (organosulfur), nitriles and organophosphorous compounds.

"Type D" refers to membrane coatings which are produced by plasma co-polymerization process of mixtures of the same aliphatic hydrocyclosiloxane monomers used in Type A membrane coatings and reactive functionalizing monomers. Suitable functionalizing monomers include $N_2$, $CO_2$, $NH_3$ and $SO_2$.

To assist in understanding the present invention, the following examples are included which describe the results of a series of experiments. The following examples relating to this invention should not, of course, be construed as specifically limiting the invention and such variations of the invention, now known or later developed, which would within the purview of one skilled in the art are considered to fall within the scope of the present invention as hereinafter claimed.

EXAMPLES

Example 1

TMCTS monomer plasma polymerized membrane hydrophobicity (Type A membrane).

Silicon chips were suspended in a System I plasma polymerization chamber. The W/FM was set as indicated in Table 1. The coating time was 15 minutes. The system pressure was set to 30 mtorr. Contact angles were measured using contact angle goniometer.

TABLE 1

Water Contact Angle Measurement of TMCTS Plasma Polymerized Membrane

| W/FM [(J/kg) × $10^{-7}$] | Substrate Type | Coating Time (Mins) | Contact Angle (degrees) |
|---|---|---|---|
| 0.80 | Silicon Chip | 15 | 103.0 ± 0.0 |
| 1.51 | Silicon Chip | 15 | 102.0 ± 1.0 |
| 1.60 | Silicon Chip | 15 | 102.7 ± 0.6 |
| 3.02 | Silicon Chip | 15 | 101.3 ± 0.6 |
| 3.20 | Silicon Chip | 15 | 103.0 ± 0.0 |
| 4.80 | Silicon Chip | 15 | 102.7 ± 0.6 |
| 6.05 | Silicon Chip | 15 | 100.7 ± 0.6 |
| 9.07 | Silicon Chip | 15 | 101.3 ± 0.6 |

Coated by plasma coating system I.
System pressure controlled at 30 mtorrs.

Example 2

TMCTS monomer plasma polymerized membrane Biocompatibility (Type A membrane).

The bio- or hemo-compatibility of TMCTS monomer plasma polymerized membrane was tested in vena cavae of sheep as a form of intravenous oxygenator, IVOX®. The amount of thrombus formed and gas transfer capability were used to assess the biocompatibility of the TMCTS monomer plasma polymerized membrane. Formation of a smaller thrombus and a higher percent of remaining gas transfer as compared to the thrombus formed and percent remaining gas transfer obtained using same material which was uncoated were judged as indications of increased biocompatibility. The results are summarized in Table 2 indicating that hollow fibers with TMCTS monomer plasma polymerized membrane have greater biocompatibility compared to the same fiber without the coating.

TABLE 2

Effects of Circulating Blood on Gas Transfer ($CO_2$) Capability of TMCTS Coated and Uncoated Hollow Fiber Oxygenator Device Implanted in Vena Cavae of Sheep and Amount of Thrombus Formed During the Implantation

| Fiber | Uncoated | | TMCTS Coated | |
|---|---|---|---|---|
| Time day | Gas Transfer % | Thrombus g/1000 $cm^2$ | Gas Transfer % | Thrombus g/1000 $cm^2$ |
| 0 | 100 | 0 | 100 | 0 |
| 2 | — | — | 104 | 0.77 |
| 3.3 | 87 | 4.22 | — | — |
| 7 | 88 | 6.14 | 100 | 3.84 |
| 14 | 42 | 11.14 | 89 | 4.22 |

Example 3

TMCTS monomer plasma polymerized membrane Gas Permeability (Type A membrane).

Figure 22:
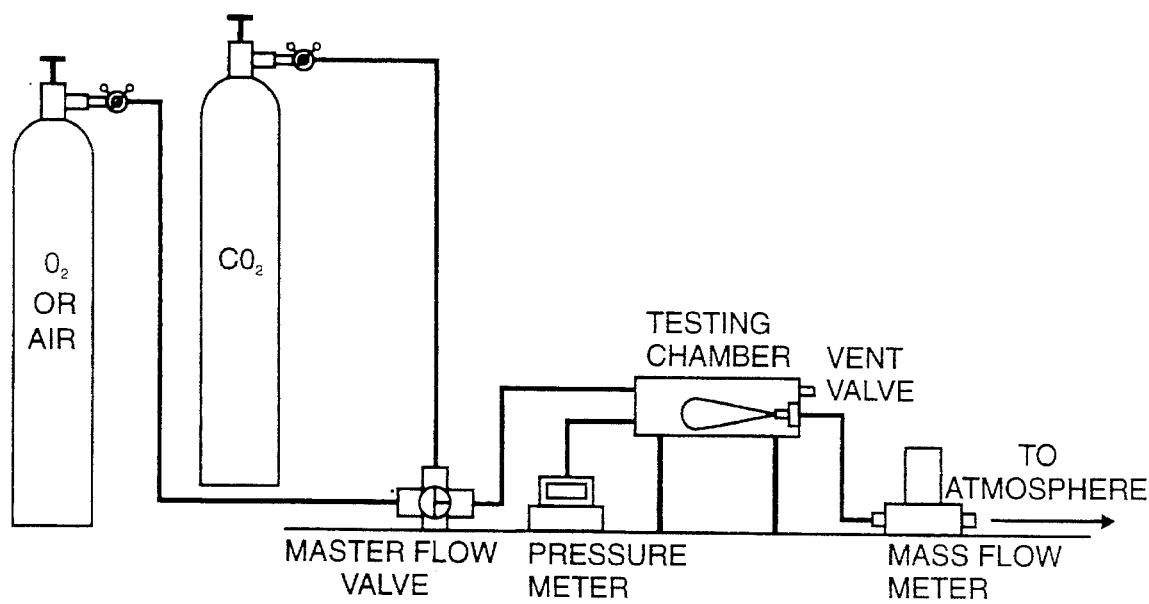
FIG. 22 depicts a schematic diagram of the gas permeability test apparatus used for measuring gas permeability of the plasma polymerized membranes of the present invention.

Microporous hollow fibers were passed through the plasma polymerization chamber at the indicated coating speed and the W/FM. Gas permeability was measured. The Gas Permeability Test Apparatus consisted of testing chamber, $O_2$ and $CO_2$ gas tanks, pressure meter and mass flow meter (FIG. 22). The fibers to be tested are bundled into five loops with one end cut open. The pressure difference between the fiber testing chamber and atmosphere is 300 mmHg. Since the gas permeability (Gp) of the fibers is also dependent on the pressure drop between the point of gas permeating through the fiber's wall and the gas outlet of the bundle, the fiber loop length is fixed at 51.9 cm. The pressure controlled gas flows from outside of the fiber through the fiber wall into the inside of the fiber and then vents to the atmosphere. The amount of $O_2$ and $CO_2$ flow through the fiber are measured by mass flow meter individually. The fiber's $O_2$ and $CO_2$ permeabilities can be calculated.

TABLE 3

Gas Permeability (Gp) of TMCTS Plasma Polymerized Membrane on Microporous Hollow Fiber

| W/FM [(J/kg) × $10^{-7}$] | Polypropylene Microporus Fiber Type [Mitsubishi KPF] | Coating Speed (cm/sec) | $G_pO_2$ ($cm^3/cm^2$ sec cmHg) | $G_pCO_2$ ($cm^3/cm^2$ sec cmHg) |
|---|---|---|---|---|
| 6.56 | KPF-190 | 14.3 | 2.5 ± 0.3 | 15.2 ± 1.5 |
| 7.20 | KPF-120 | 16.9 | 3.0 ± 0.3 | 12.5 ± 0.8 |
| 6.56 | KPF-250 | 12.1 | 2.5 ± 0.7 | 13.8 ± 2.0 |

Coated by plasma coating system I.
System Pressure: controlled at 39 mtorr.

Example 4

Insulating Properties

A silicon chip was inserted in a system I plasma polymerization chamber for 3 minutes at 25 mtorr and W/FM as indicated in Table 4. DC conductivity was measured using a HP4145A semiconductor parameter analyzer. The HP4145A semiconductor parameter analyzer had a platinum electrode inserted in a drop on the surface of the silicon sample. Another electrode was attached to the other side of the sample. the liquid used for measurement was 0.9% sodium chloride. A 3 mm diameter drop having an area of about 7 $mm^2$ was used for the measurements. Specifications of the HP4145A included:

| In the output range of ± 8 V | |
|---|---|
| Resolution | 1 mU |
| Accuracy | 0.24% |
| In the input current range of <20 pA | |
| Accuracy | 1.5% |
| Input resistance is <$10^{12}$ Ω | |

The measurements set forth in Table 4 were taken with ±8 V output voltage with current limit of 1 nA. The measurements were made on the flat part of the samples and did not include the edge.

TABLE 4

DC Conductivity Data for Plasma Polymerized Membrane

| W/FM [(J/kg) × $10^{-7}$] | Substrate Type | coating Time (Mins) | DC Conductivity (Ω cm)$^{-1}$ |
|---|---|---|---|
| 3.78 | Silicon Chip | 3 | 2.9 × $10^{-15}$ |
| 7.56 | Silicon Chip | 3 | 4.0 × $10^{-15}$ |

Coated by plasma coating system I.
System pressure controlled at 25 mtorr.

Example 5

ESCA Analysis

Silicon chips were suspended in a System II plasma polymerization chamber for 10 minutes at the W/FM as indicated in Table 5. The ESCA analysis was performed on a HP5950 ESCA System.

TABLE 5

ESCA Elemental Analysis of TMCTS Plasma Polymerized Membrane

| W/FM [(J/kg) × $10^{-7}$] | Substrate Type | Coating Time (Min) | C (%) | O (%) | Si (%) |
|---|---|---|---|---|---|
| 3.8 | Silicon Chip | 10 | 31.6 | 31.3 | 37.1 |
| 7.2 | Silicon Chip | 10 | 31.9 | 31.6 | 36.5 |
| 11.9 | Silicon Chip | 10 | 31.3 | 32.0 | 36.7 |
| 15.8 | Silicon Chip | 10 | 31.7 | 32.2 | 36.1 |
| 19.8 | Silicon Chip | 10 | 31.7 | 32.2 | 36.1 |

Coated by batch type plasma coating system II.
System pressure controlled between 13 and 30 mtorr.

Example 6

ESCA Analysis

Silicon chips were suspended in a System I plasma coating system. The coating conditions were indicated in Table 6. The ESCA analysis was performed on a HP5950 ESCA system.

TABLE 6

ESCA Elemental Analysis and Water Contact Angle Measurement of Plasma Copolymerized Membrane

| Monomers (mmole) | Plasma condition Power (W)/ pressure (retorr)/ time (min) | Elemental Formula | Contact Angle (degrees) |
|---|---|---|---|
| TMCTS (5.5) + Hexafluoro-propylene (14.3) | 90/19/20 | $C_{1.0}O_{1.0}Si_{1.1}F_{0.4}$ | 100 ± 0 |
| TMCTS (5.5) + Ethylene (48.57) | 90/39/10 | $C_{1.0}O_{0.9}Si_{1.0}$ | 96 ± 0 |
| TMCTS (5.5) + TMS-AA (10.35) | 90/30/10 | $C_{1.0}O_{0.6}Si_{0.7}N_{0.1}$ | 90 ± 0 |
| TMCTS (5.5) + | 90/48/10 | $C_{1.0}O_{3.0}Si_{1.1}S_{0.5}$ | 64.3 ± 0.6 |

TABLE 6-continued

ESCA Elemental Analysis and Water Contact Angle
Measurement of Plasma Copolymerized Membrane

| Monomers (mmole) | Plasma condition Power (W)/ pressure (retorr)/ time (min) | Elemental Formula | Contact Angle (degrees) |
|---|---|---|---|
| $SO_2$ (50.8) | | | |

Coated by plasma coating system I.

Example 7

TMCTS Plasma Polymerized Membrane (Type A Membrane)

Figure 3A:
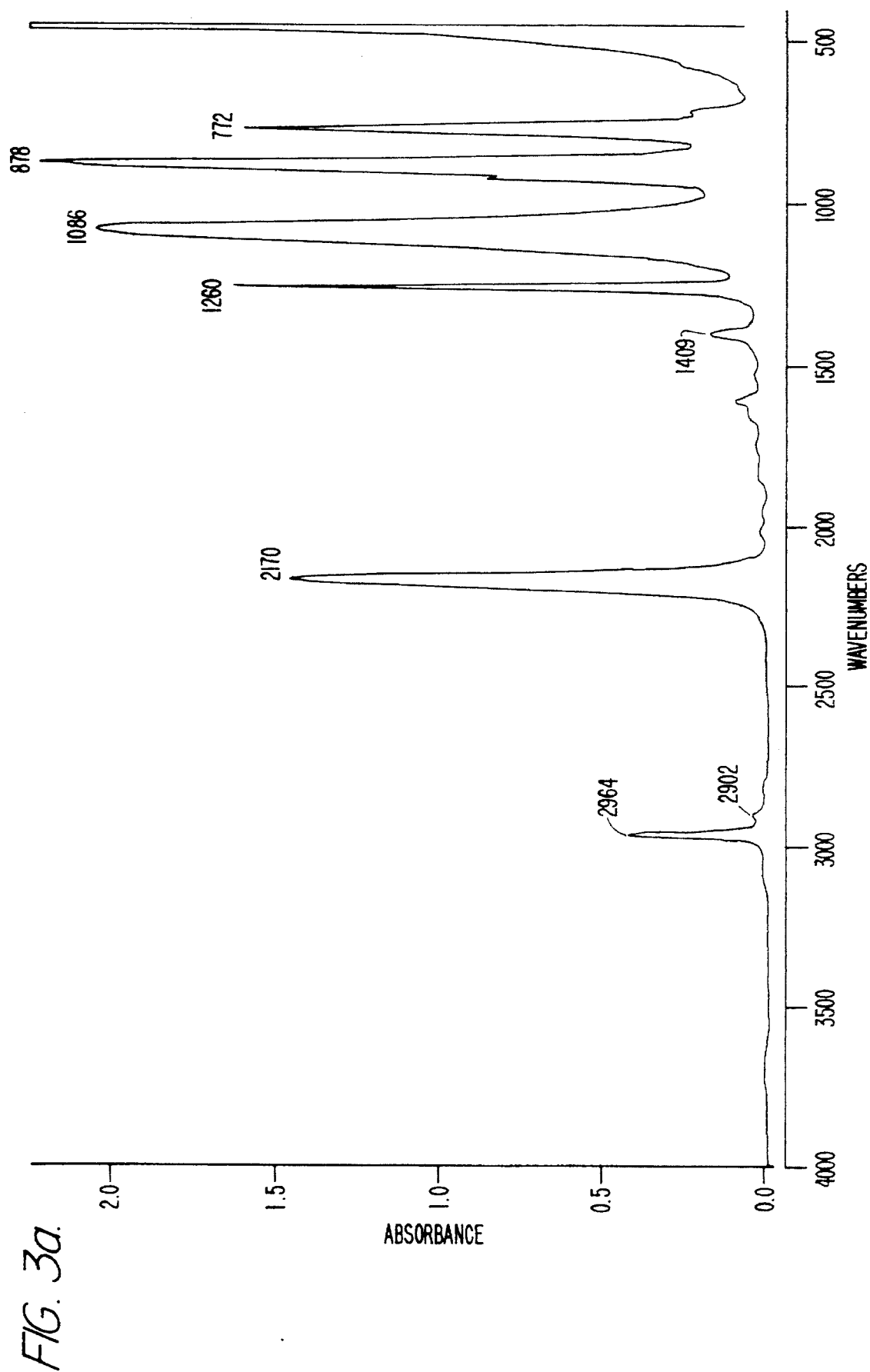
FIGS. 3A and 3B depict Fourier Transform Infrared Spectroscopy (FTIR) spectra.
Figure 3B:
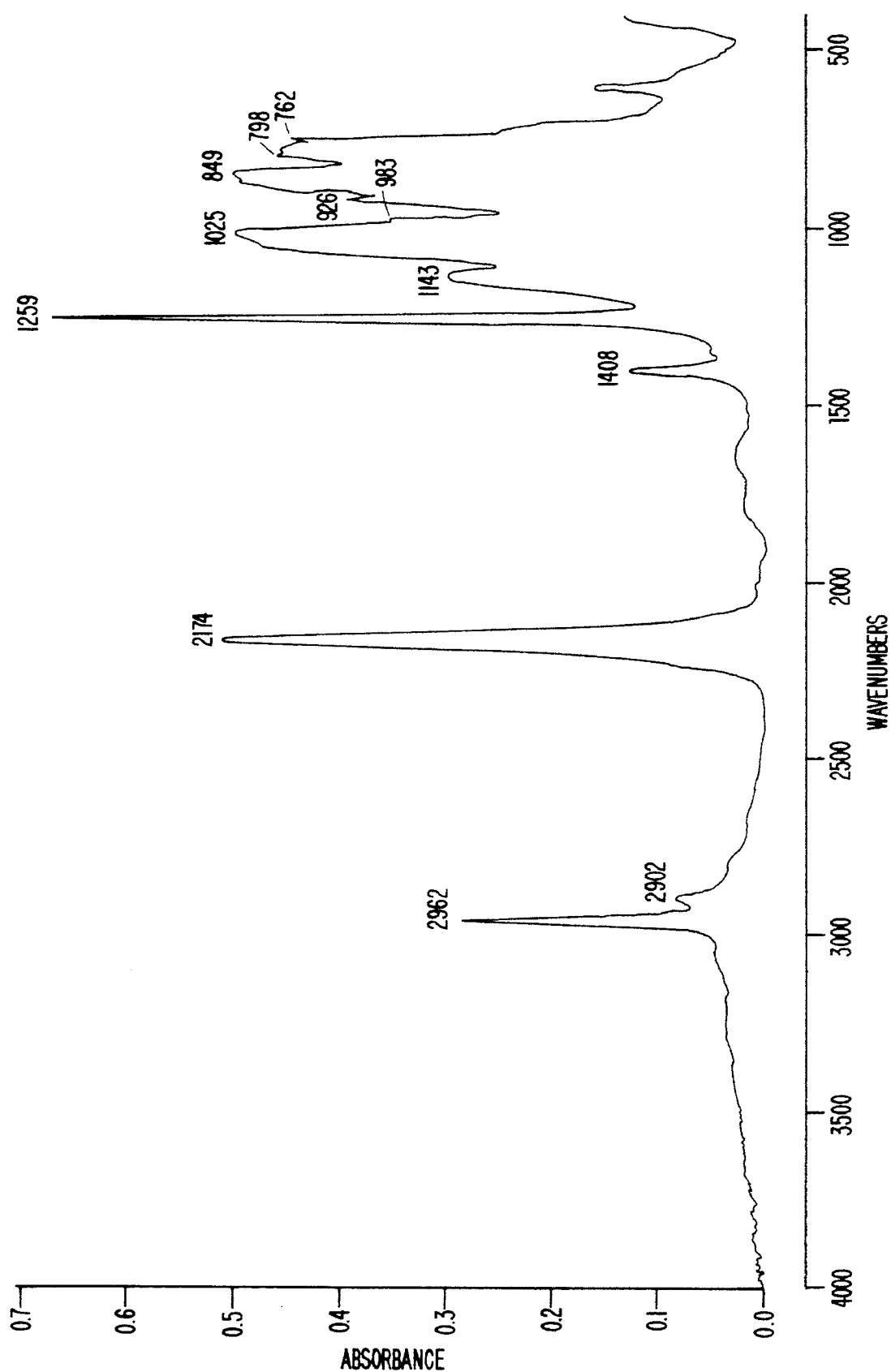
Figure 4:
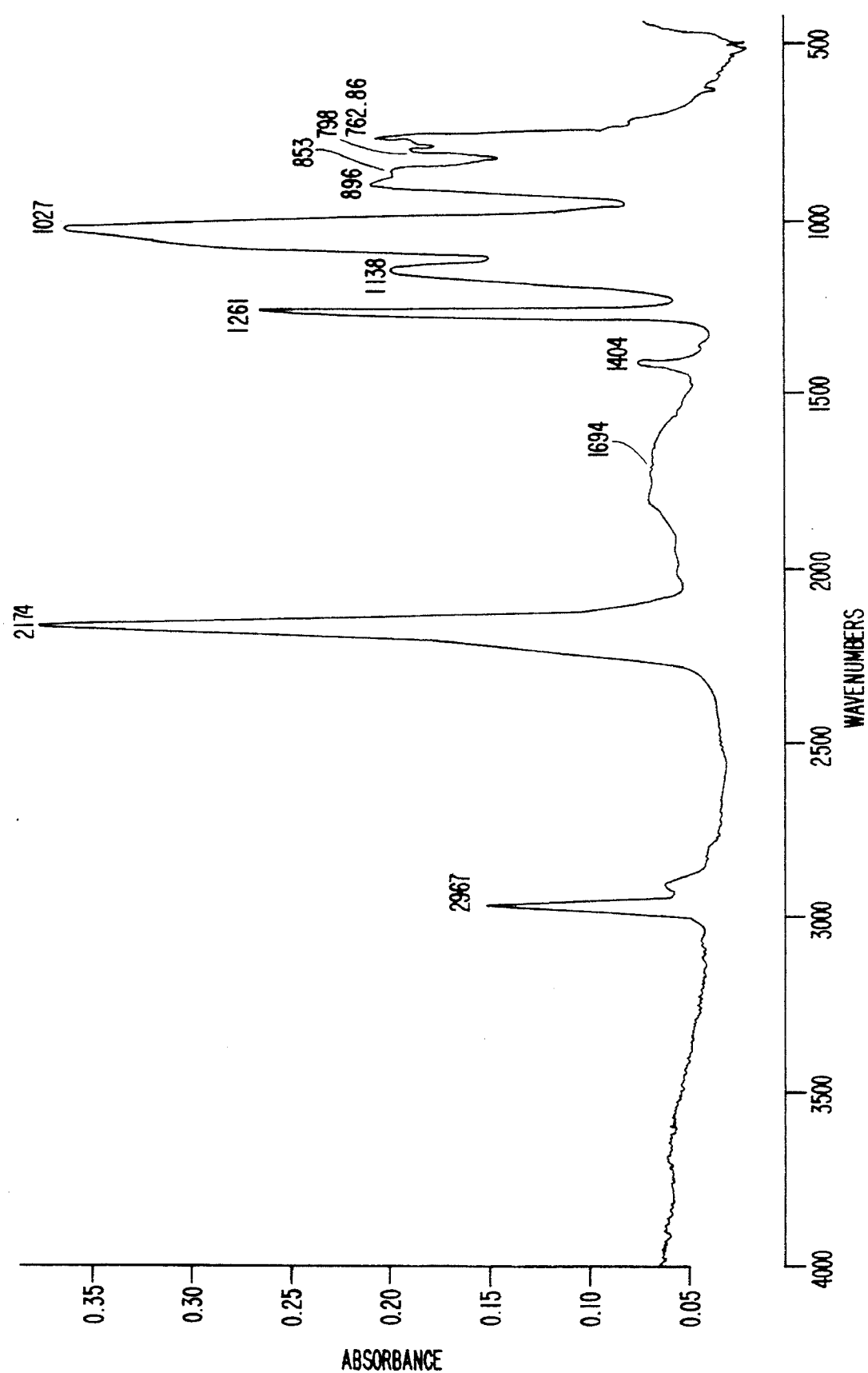
FIG. 4 depicts a FTIR spectra of XMCXS (a mixture of 1,3,5,7,9-pentamethylcyclopentasiloxane (PMCPS) and 1,3,5,7,9,11-hexamethylcyclohexasiloxane (HMCHS)) plasma polymerized membrane.

The membrane is identified by its distinctive FTIR and ESCA spectra bands as depicted in FIGS. 3A, 3B and 4. Most major IR absorption bands identified in the TMCTS monomers can be found in the TMCTS and XMCXS plasma polymerized membranes. Two broad, intense bands near 1025 cm$^{-1}$ and 1143 cm$^{-1}$ indicate Si—O stretching vibrations of linear Si—O—Si structures. The TMCTS monomer had a cyclic Si—O—Si ring structure, and its spectrum showed a IR band at 1082 cm$^{-1}$. During the plasma polymerization process, cyclic Si—O—Si ring opening occurred and the resulting membrane had linear Si—O—Si structures which have IR bands at 1025 cm$^{-1}$ and 1143 cm$^{-1}$. Several absorption bands between 700 cm$^{-1}$ and 1100 cm$^{-1}$ of the membrane indicated its chemical complexity. Although these spectra may vary slightly, the presence of the following bands are strongly indicative of the membrane. The band near 2960 cm$^{-1}$ indicates the C—H asymmetric stretching of $CH_3$; the band near 2902 cm$^{-1}$ indicates the C—H symmetric stretching of $CH_3$; the band near 2170 cm$^{-1}$ indicates the Si—H stretching; the band near 1260 cm$^{-1}$ characterizes the $CH_3$ rocking mode in Si—$CH_3$; the two bands near 849 cm$^{-1}$ and 794 cm$^{-1}$ indicates Si—C stretching. The strong Si—H absorption band indicates that the Si—H group was largely preserved in the plasma polymerized aliphatic hydrocyclosiloxane membrane. The Si—H structure was considered a major contributing factor to thromboresistant characteristics.

The distinctive ESCA spectrum (FIGS. 9A to 9C and 10A to 10C) showed the unique plasma polymerized aliphatic hydrocyclosiloxane membrane features in the Carbon 1s, Oxygen 1s, and Silicon 2p spectra. The Carbon 1s ESCA spectrum showed one peak at 284.6 eV binding energy (BE). No detectable peak was found at higher BE, indicating that the carbon atoms in the aliphatic hydrocyclosiloxane membrane were bonded with silicon atoms. No oxidized carbon was detected by ESCA. Silicon 2p ESCA spectrum showed the major peak located near 102 eV which is assigned to —O—Si—O—Si— type bonding. The minor peak at 100 eV was assigned to —Si—C type bonding. The oxygen in ESCA spectrum showed one peak near 532 eV which is assigned to —Si—O—Si—O— type bonding.

Furthermore, the ESCA spectra revealed the near 1:1:1 atomic ratio of carbon:oxygen:silicon which was another indication that the elemental composition of the TMCTS monomer is preserved in the plasma polymerized aliphatic hydrocyclosiloxane membrane (Table 5 and FIG. 4).

The SEM picture (FIG. 18B) showed the uniform morphology of plasma polymerized TMCTS membrane.

When the microporous hollow fiber was completely covered with the membrane, the $O_2$ and $CO_2$ gas permeability and $CO_2/O_2$ selectivity ratio of the plasma polymerized aliphatic hydrocyclosiloxane membrane, as measured in the form of fiber loops, was greater than 1.5. The selectivity ratio continually increased as the thickness of the membrane increased with selectivity leveling out at about 7.0. The thickness of the membrane was measured by weight comparison or by SEM pictures of the cross-section membrane.

Example 8

TMCTS monomer plasma copolymerized with hexafluoropropylene gas (Type B membrane)

Hexafluoropropylene gas ($C_2F_6$) was plasma copolymerized with TMCTS monomer. A radio frequency power of 90 W, a system pressure of 19 mtorr, and a TMCTS monomer flow rate of 5.5 μmole/sec and a hexafluoropropylene flow rate of 14.3 μmole/sec produced a membrane coating with increased tissue compatibility, without significantly altering the useful characteristics of Type A membrane. This membrane has an empirical elemental formula $C_{1.0}O_{1.0}Si_{1.1}F_{0.4}$ and a water contact angle of 100 degrees (Table 6).

The FTIR spectrum (FIG. 5) showed that the plasma copolymerized $C_2F_6$/TMCTS membrane still retained most of the siloxane IR absorption bands but the relative intensities of the bands were changed: a broad and weak band appeared between 1600 cm$^{-1}$ and 1900 cm$^{-1}$ a result of C=O stretching; a band near at 1274 cm$^{-1}$ —$CF_2$ and $CF_3$ (C—F asymmetric stretching); a band near 1177 cm$^{-1}$ and a band near 925 cm$^{-1}$ (C—F stretching); and a band near 1260 cm$^{-1}$ which was believed due to siloxane $CH_3$ rocking mode in Si—$CH_3$. The IR band near between 1030 and 820 cm$^{-1}$ (Si—F) was not clearly observed due to the overlap of the IR band at 1025 cm$^{-1}$ which corresponded to linear Si—O—Si.

Co-plasma polymerization of TMCTS and hexafluoropropylene resulted in a material that produced a dramatically different FTIR spectrum than TMCTS plasma polymerized membrane in the region between 500 cm$^{-1}$ and 1100 cm$^{-1}$. The IR intensity of Si—O—Si and Si—C bands in the $C_2F_6$/TMCTS membrane were broader and weaker than the aliphatic hydrocyclosiloxane membrane. FTIR analysis of the plasma copolymerized $C_2F_6$/TMCTS membrane indicated that the F atoms were incorporated into the structure of siloxane membrane.

The ESCA spectrum of the membrane showed that the hexafluoropropylene was incorporated into the siloxane structure (FIGS. 11A to 11D). The Carbon 1s ESCA spectrum showed a major peak at 284.6 eV which was attributed to the alkyl carbons bonded to silicon. A tail which extended from 286 eV to 290 eV was either attributable to carbon associated with fluorine (C—$F_x$, X=1 to 3) or to carbon associated with fluorocarbons (C—$F_x$, x=1 to 3). Since the F/C ratio was 0.4 and since the majority of carbon atoms were bonded with silicon, these observations indicated that a portion of fluorine atoms were bonded with silicon.

Example 9

TMCTS Monomer Plasma Copolymerized With Ethylene Gas (Type C Membrane)

Ethylene gas was plasma copolymerized with TMCTS monomer. Using a radio frequency power of 90 W and a system pressure of 39 mtorr, a mixture of TMCTS monomer flow rate of 5.5 μmole/sec and ethylene flow rate of 48.6 μmole/sec produced a membrane with the empirical elemental formula of $C_{1.0}O_{0.9}Si_{1.0}$ and water contact angle of 96 degrees (Table 6).

In addition to the peaks found in the FTIR spectra of TMCTS membrane (FIG. 3B), the $C_2H_4$/TMCTS membrane (FIG. 6) showed a new band near 2910 cm$^{-1}$; a new band near 2876 cm$^{-1}$ C—H (stretching of $CH_2$); and a new but weak and broad band near 1716 cm$^{-1}$ C=O

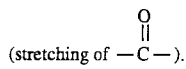

(stretching of —C—).

The intensity of Si—H stretching was decreased and the intensity of C—H stretching was increased. The increased intensity at 1009 cm$^{-1}$ was due to overlapping of the —CH=CH2 band and Si—O—Si band; the appearance of C=O stretching indicated a mild membrane oxidation.

The ESCA spectra of the $C_2H_4$/TMCTS membrane (FIGS. 12A to 12C) indicated incorporation of ethylene into the siloxane structure, accompanied by a 4 to 5% carbon atomic increase. The Silicon 2 p ESCA spectrum clearly showed the carbon from ethylene largely bonded to silicon atoms and not to oxygen atoms. Incorporation of alkyl carbons will increase the carbon content of the siloxane membrane and the membrane will attain the physical and chemical characteristics of alkyl carbons and siloxane membranes. The added alkyl carbon chain changes the pore size, chemical affinity, and cross-linked density of the siloxane membrane. This type of membrane will have applications in gas and liquid separations.

Example 10

TMCTS Monomer Plasma Copolymerized With TMS-AA (Type C Membrane)

TMS-AA was plasma copolymerized with TMCTS monomer. Using a radio frequency power of 90 W, a system pressure of 30 mtorr, a mixture of TMCTS monomer flow rate of 5.5 μmole/sec and TMS-AA flow rate of 10.4 μmole/sec produced a membrane with the empirical elemental formula of $C_{1.0}O_{0.6}Si_{0.7}N_{0.1}$ and water contact angle of 90 degrees (Table 6).

The FTIR spectrum (FIG. 7) of the TMS-AA/TMCTS membrane showed a band near 2910 cm$^{-1}$ and a band near 2876 cm$^{-1}$ (C—H stretching of $CH_2$); and a band near 3385 cm$^{-1}$ (NH stretching). The absorption bands between 500 cm$^{-1}$ and 1100 cm$^{-1}$ increased in a manner similar to the changes that are observed in the plasma copolymerized $C_2H_4$/TMCTS membrane. (See Example 6.) Both membranes have a hydrocarbon backbone.

Figure 13A:
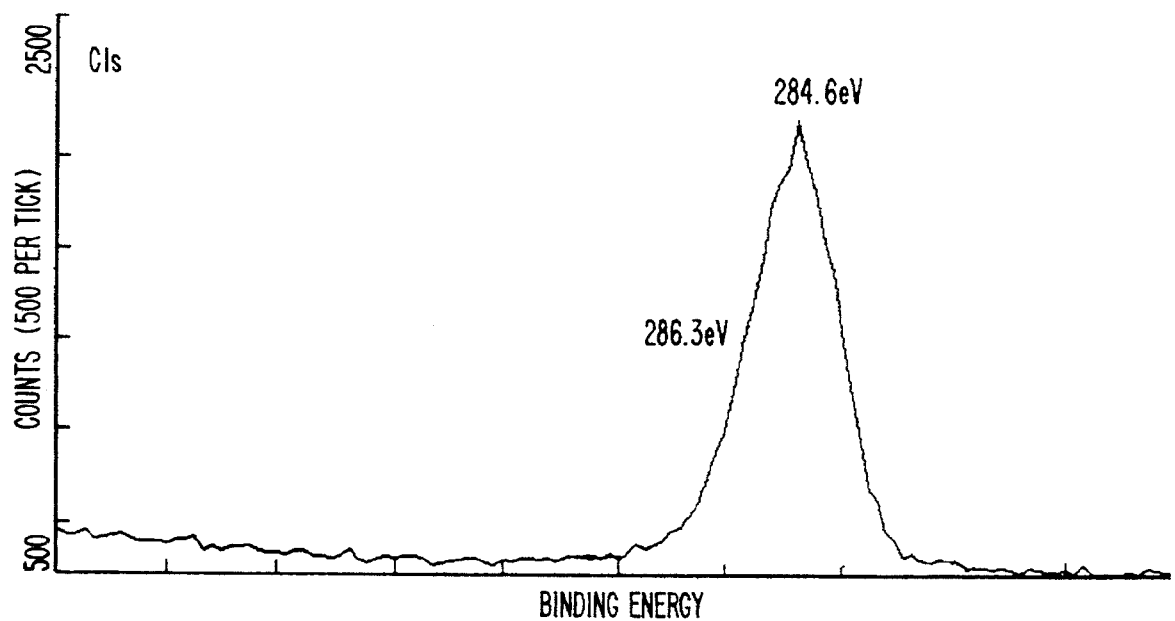
FIGS. 13A to 13D depict ESCA spectra of plasma copolymerized membrane made from TMCTS and TMSAA monomers.
Figure 13B:
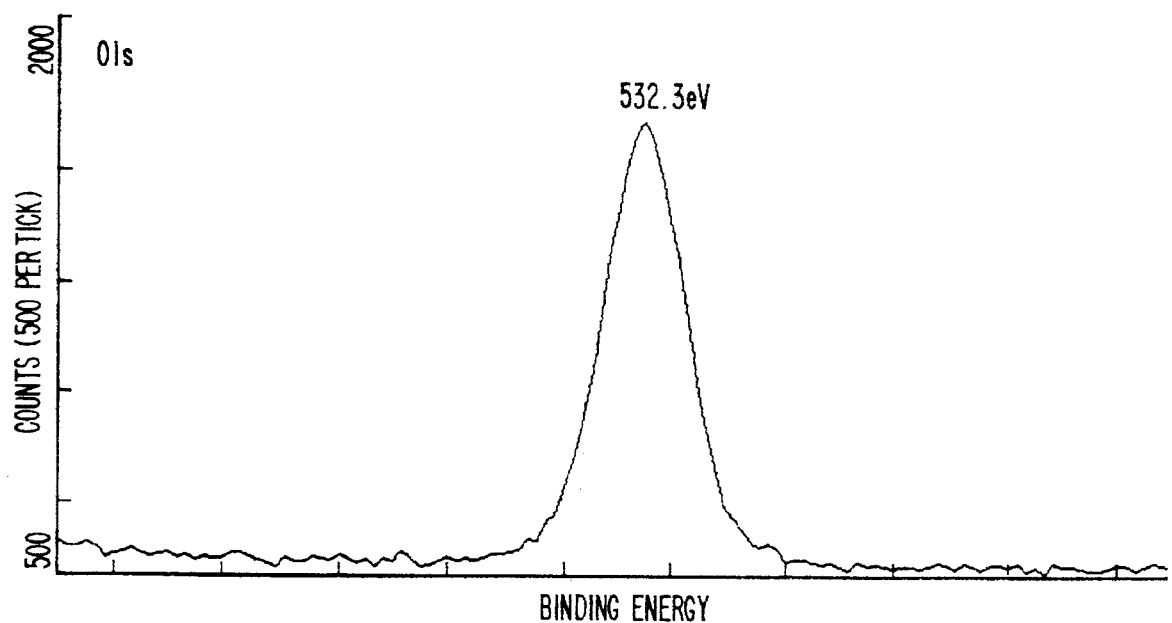
Figure 13C:
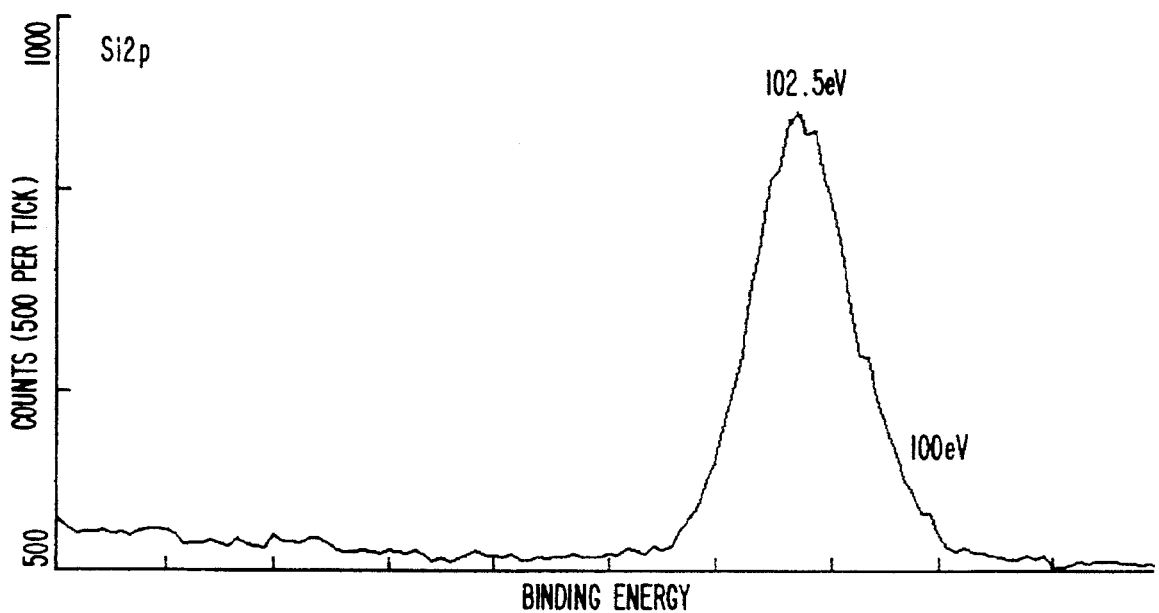
Figure 13D:
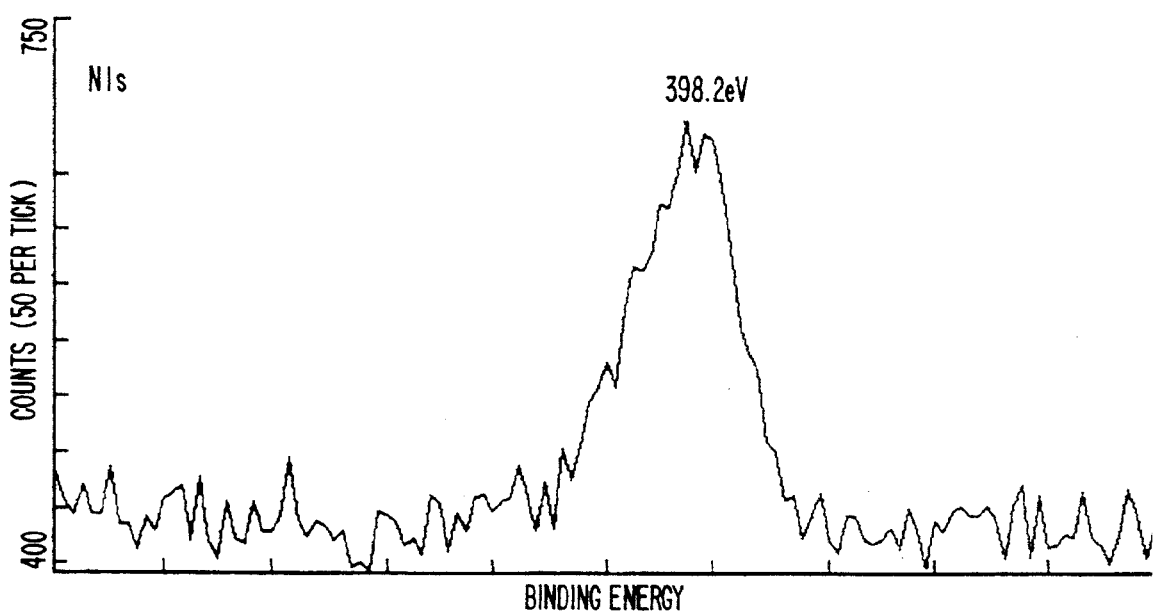
Figure 14A:
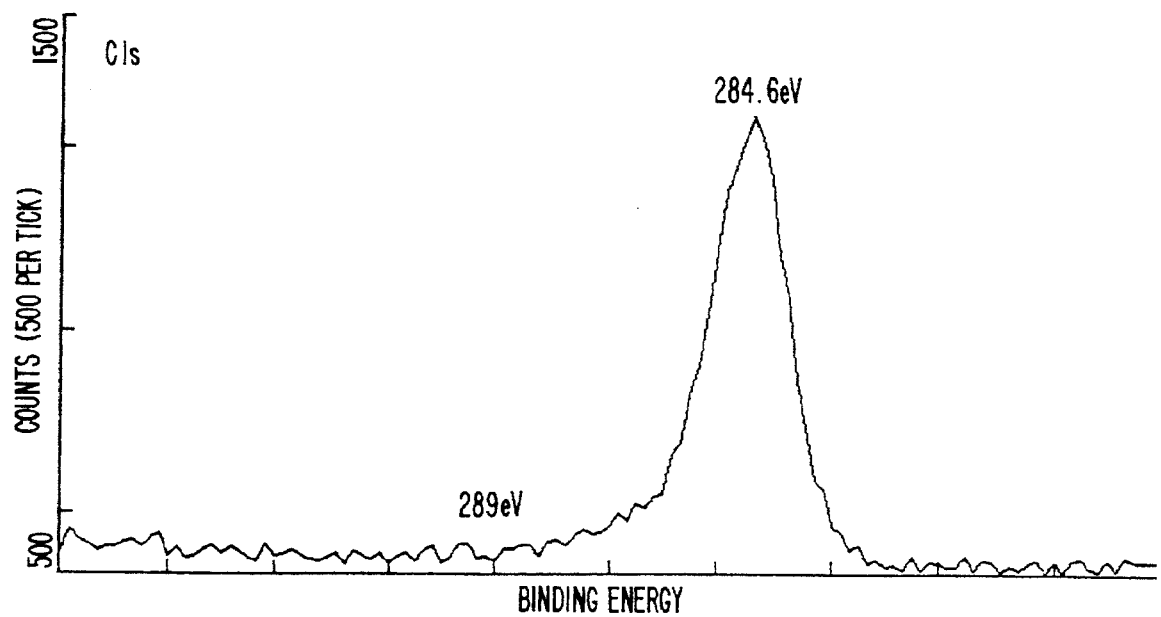
FIGS. 14A to 14E depicts ESCA spectra of plasma copolymerized membrane from TMCTS monomer and $SO_2$ gas.
Figure 14B:
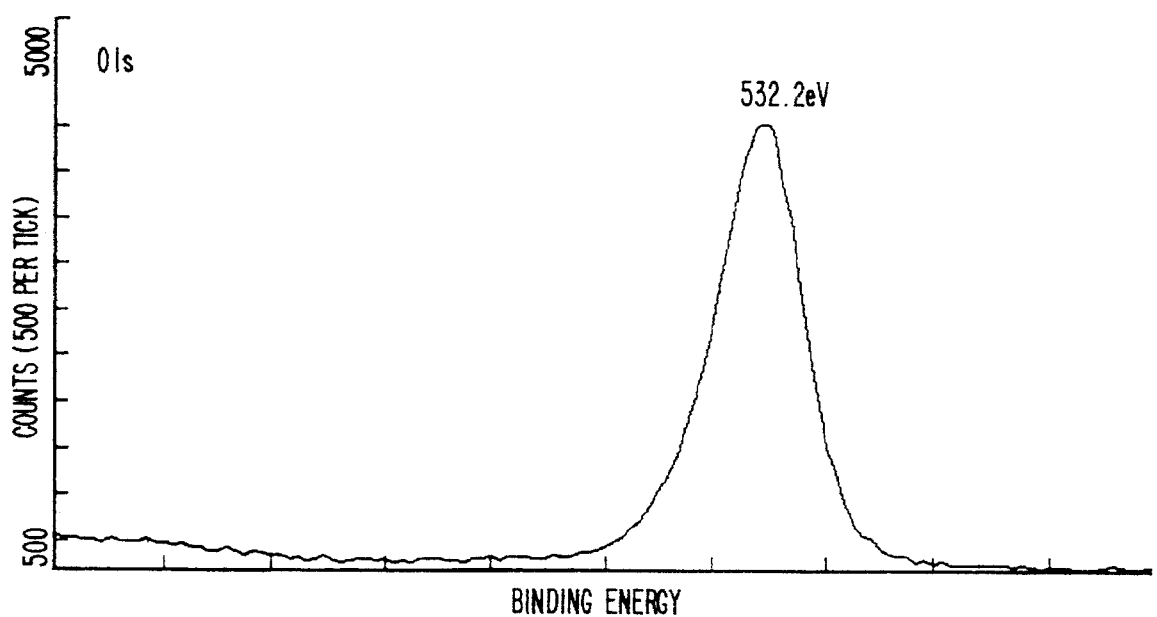
Figure 14C:
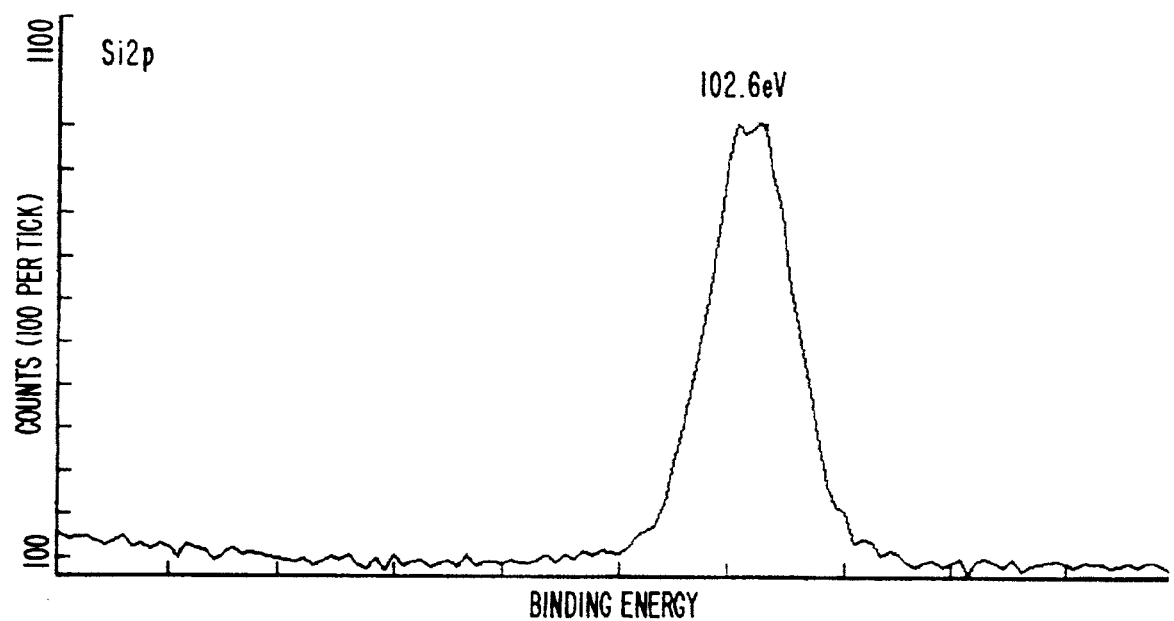
Figure 14D:
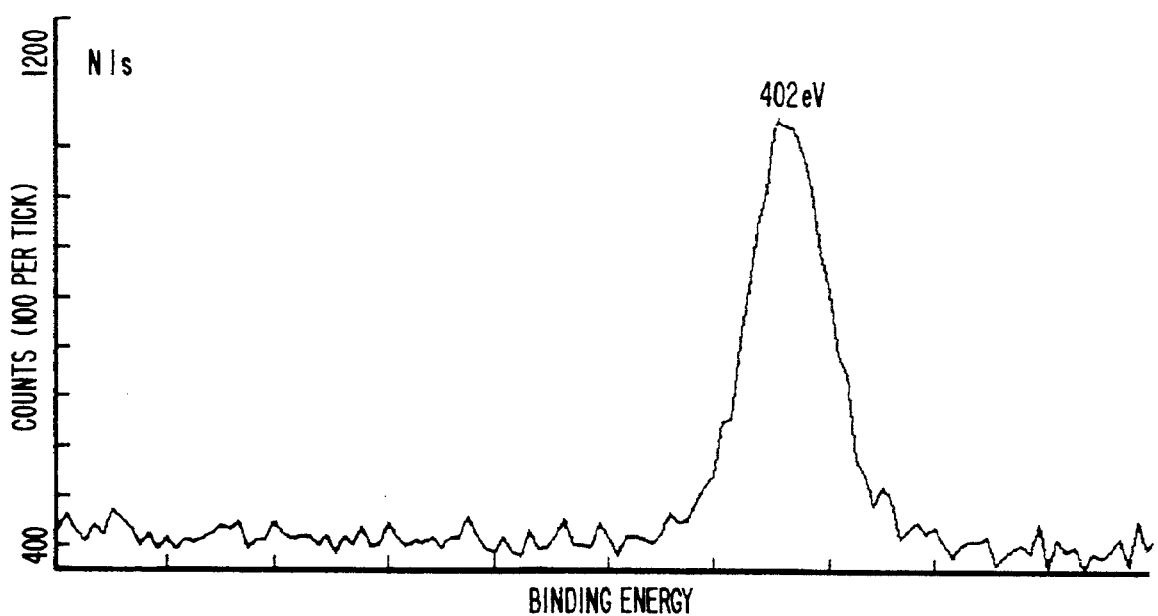
Figure 14E:
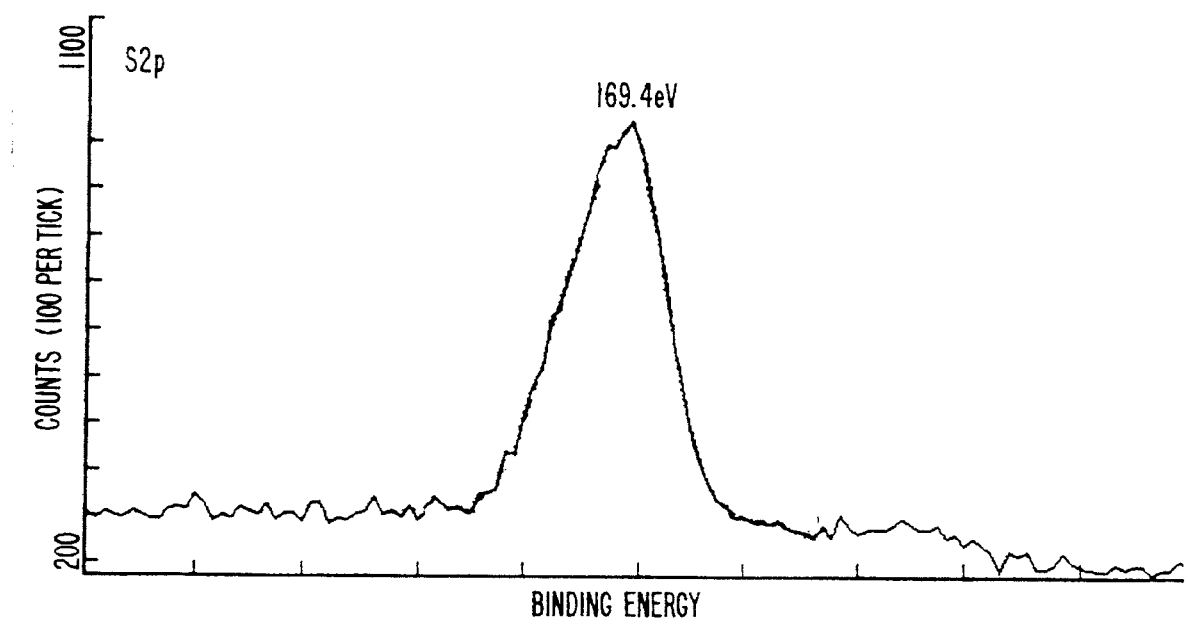
Figure 15:
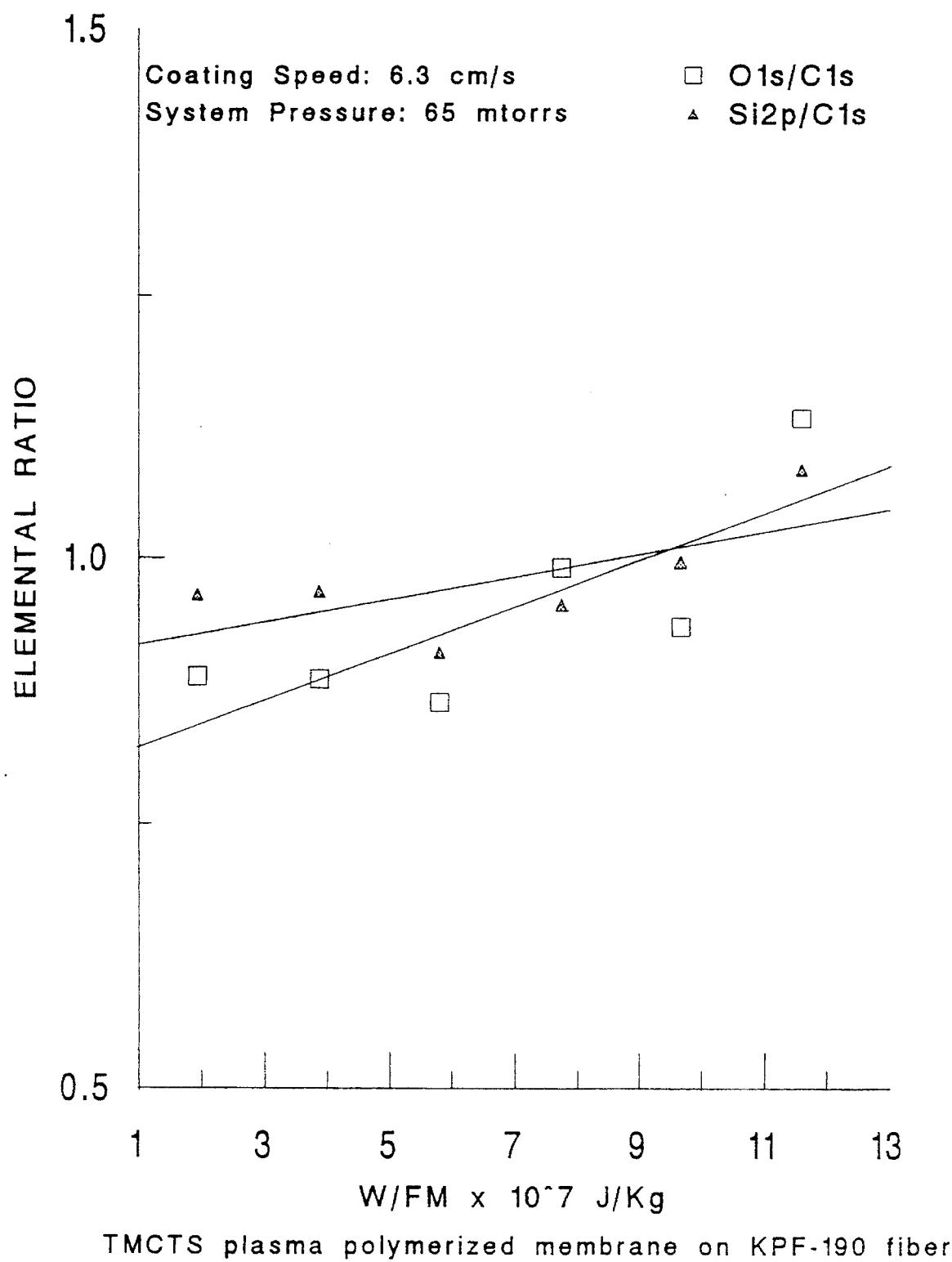
FIG. 15 depicts a plot of the ESCA elemental ratio of oxygen/carbon and silicon/carbon of TMCTS plasma polymerized membrane on polypropylene microporous hollow fiber (MITSUBISHI KPF-190 fiber) as a function of W/FM.

The Carbon 1s ESCA spectrum showed the C—N type bonding at around 286.3 eV. (See FIG. 13A). The Silicon 2p ESCA spectrum showed a large increase of Si—C type bonding at around 100 eV which indicated incorporation of —Si(CH$_3$)$_3$ into the membrane. This observation was corroborated by the Nitrogen 1s ESCA spectrum. (See FIGS. 13C and 13D).

Example 11

$SO_2$ Gas Plasma Copolymerized With TMCTS Monomer (Type D Membrane).

$SO_2$ gas was plasma copolymerized with TMCTS monomer. Using a radio frequency power of 90 W, a system pressure of 48 mtorr, a mixture of TMCTS monomer flow rate of 5.5 μmole/sec and $SO_2$ gas flow rate of 50.8 μmole/sec produced a membrane with the empirical elemental formula of $C_{1.0}O_{3.0}Si_{1.1}S_{0.5}$ and water contact angle of 64 degrees (Table 6).

Comparison of the FTIR spectrum of the TMCTS membrane and the TMCTS/$SO_2$ membrane showed pronounced differences in the membranes. In the FTIR spectrum of TMCTS/$SO_2$ membrane, two overlapping peaks occurred between 2170–2240 cm$^{-1}$. The peak at 2174 cm$^{-1}$ was consistent with Si—H; the identity of the other peak was much less certain and was probably due to a nitrogen impurity. The TMCTS/$SO_2$ film also showed characteristic peaks at 1408–1400, 1285 and 1206 cm$^{-1}$ which were considered indicative of covalently bound organic sulfate and sulfonate moieties.

The ESCA spectra of TMCTS/$SO_2$ plasma copolymerized membrane (FIGS. 14a to 14E) showed that the increasing O/C ratio was due to incorporation of $SO_2$ into the siloxane structure. In the carbon 1s ESCA spectrum, the peak at 284.6 eV was due to the alkyl carbons bonded with the silicones, and the broad tail extended from 284.6 to 289 eV was oxidated carbon. The reactive oxygen was created by dissociation of the $SO_2$ in the plasma state. In the Sulfur 2p ESCA spectrum, the peak at 169.4 eV (sulfur 2p$_{3/2}$) is attributed to covalent sulfate type bonding. The ESCA spectrum also indicated a Nitrogen 1s signal at 402 eV corresponding to 4% atomic nitrogen. The presence of nitrogen was due to an impurity.

We claim:

1. A composition of matter comprising a membrane formed from the plasma polymerization of hydrocyclosiloxane monomer of the general formula:

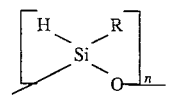

where R is an aliphatic group having 1 to about 5 carbon atoms and n is an integer from 2 to about 10.

2. A composition of claim 1, wherein n is 7 to 10.

3. A composition of claim 1, wherein n is 4 to 6.

4. A composition of claim 1, wherein n is 2 to 3.

5. A composition of claim 1, wherein said hydrocyclosiloxane monomer is selected from the group consisting of 1,3,5,7-tetramethylhydrocyclotetrasiloxane, 1,3,5,7,9-pentamethylhydrocyclopentasiloxane, 1,3,5,7,9,11-hexamethylhydrocyclohexasiloxane, and a mixture of 1,3,5,7,9-pentamethylcyclopentasiloxane and 1,3,5,6,9,11-hexamethylcyclohexasiloxane monomers.

6. A composition of claim 1, wherein said membrane has a FTIR spectra characterized by absorption bands at 2960 cm$^{-1}$, 2902 cm$^{-1}$, 2170 cm$^{-1}$, 1260 cm$^{-1}$, 1025 cm$^{-1}$ and 1143 cm$^{-1}$.

7. A composition of claim 1, wherein said membrane exhibits FTIR spectra substantially the same as FIG. 3.

8. A composition of claim 1, wherein said membrane exhibits FTIR spectra substantially the same as FIG. 4.

9. A composition of claim 1, wherein said membrane exhibits ESCA spectra substantially the same as FIGS. 9A to 9C.

10. A composition of claim 1, wherein said membrane exhibits ESCA spectra substantially the same as FIGS. 10A to 10C.

11. A composition comprising a membrane formed from the plasma copolymerization of a hydrocyclosiloxane monomer of the general formula:

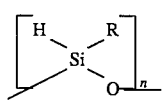

where R is a aliphatic group and n is an integer from 2 to about 10, and a co-monomer selected from the group consisting of fluorocarbon monomers, organo-based monomers selected from the group consisting of ethylene, allylamine, N-trimethylsilylallylamine, hydrocarbons, N-protected unsaturated amines, N-unprotected unsaturated amines, N-protected cyclic aliphatic amines, N-unprotected cyclic aliphatic amines, mercaptans, nitriles and organophosphorus compounds; and functionalizing monomers selected from the group consisting of $N_2$, $CO_2$, $NH_3$ and $SO_2$.

Figure 5:
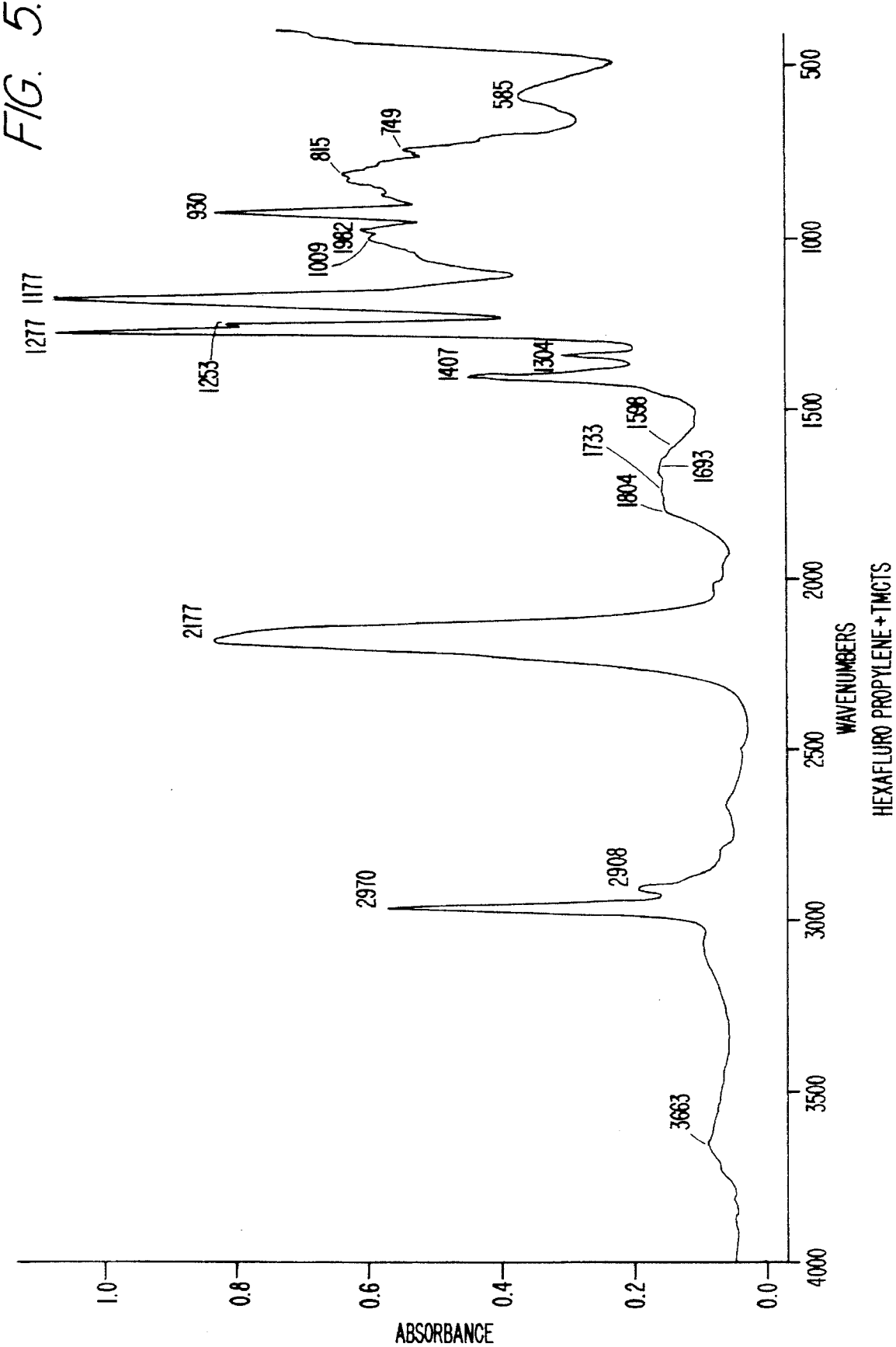
FIG. 5 depicts a FTIR spectrum of plasma copolymerized membrane made from TMCTS monomer and hexafluoropropylene gas.
Figure 6:
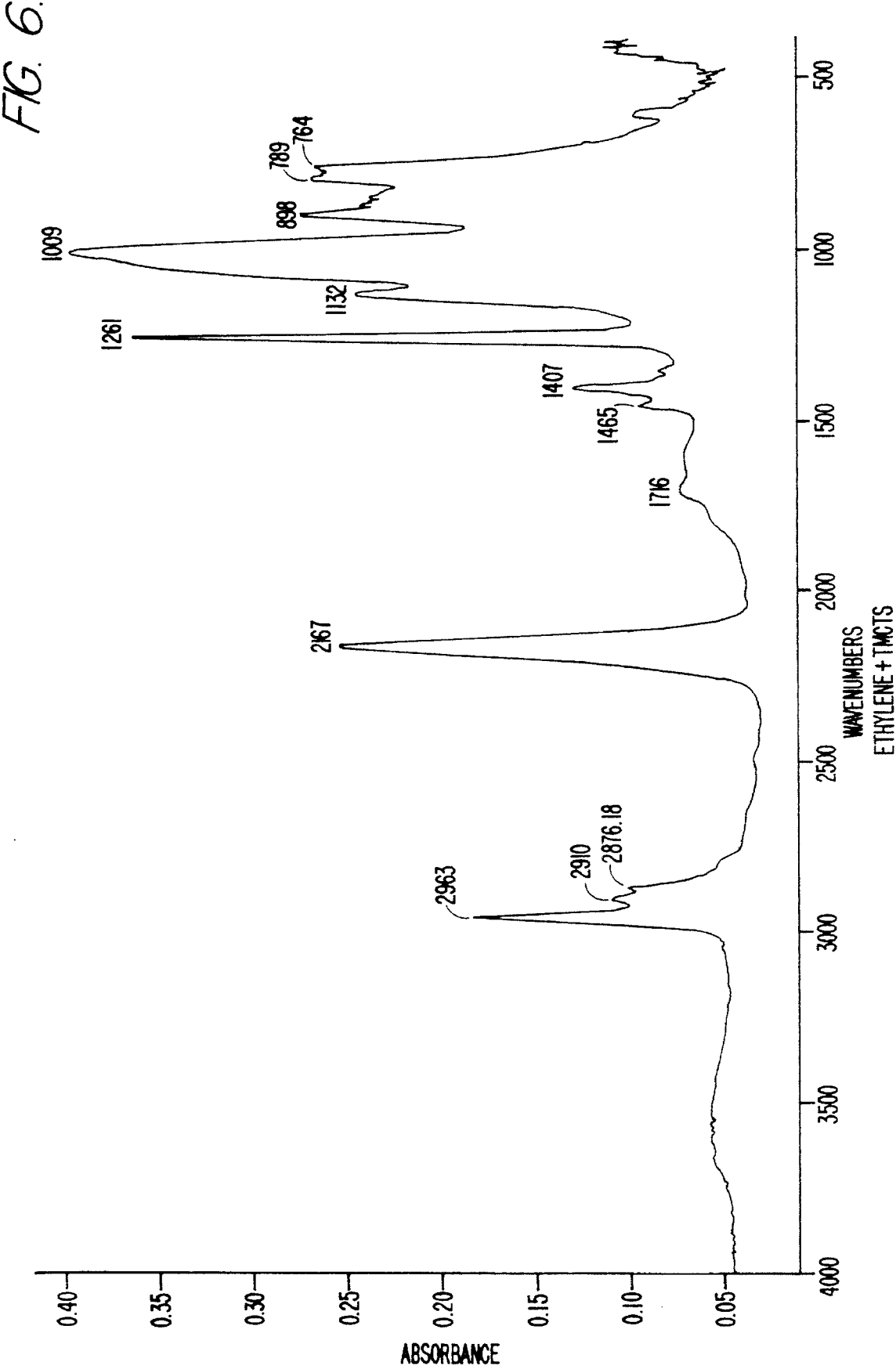
FIG. 6 depicts a FTIR spectrum of plasma copolymerized membrane made from TMCTS monomer and ethylene gas.
Figure 7:
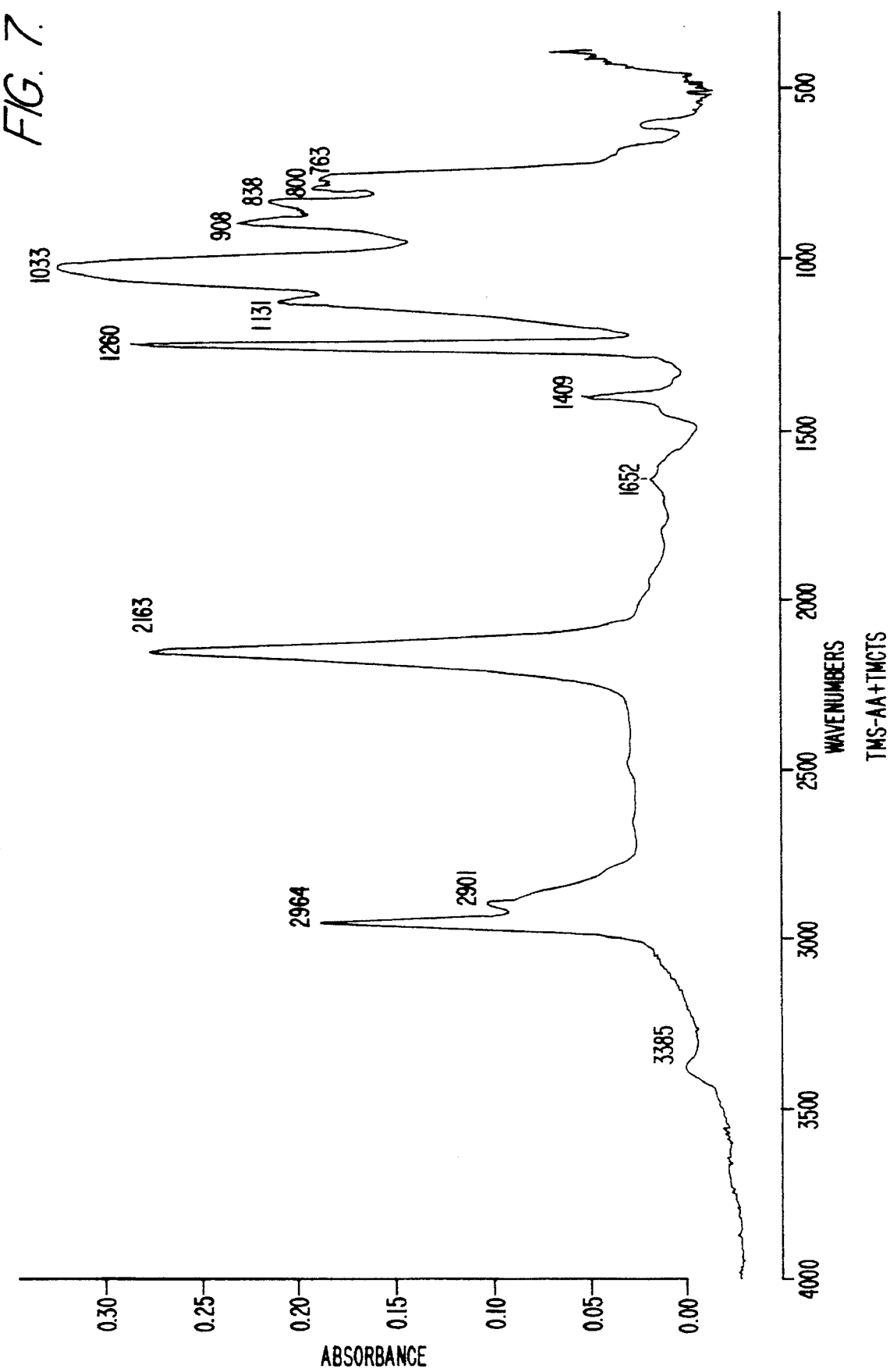
FIG. 7 depicts a FTIR spectrum of plasma copolymerized membrane made from TMCTS and N-trimethylsilylallylamine (TMSAA) monomers.
Figure 8:
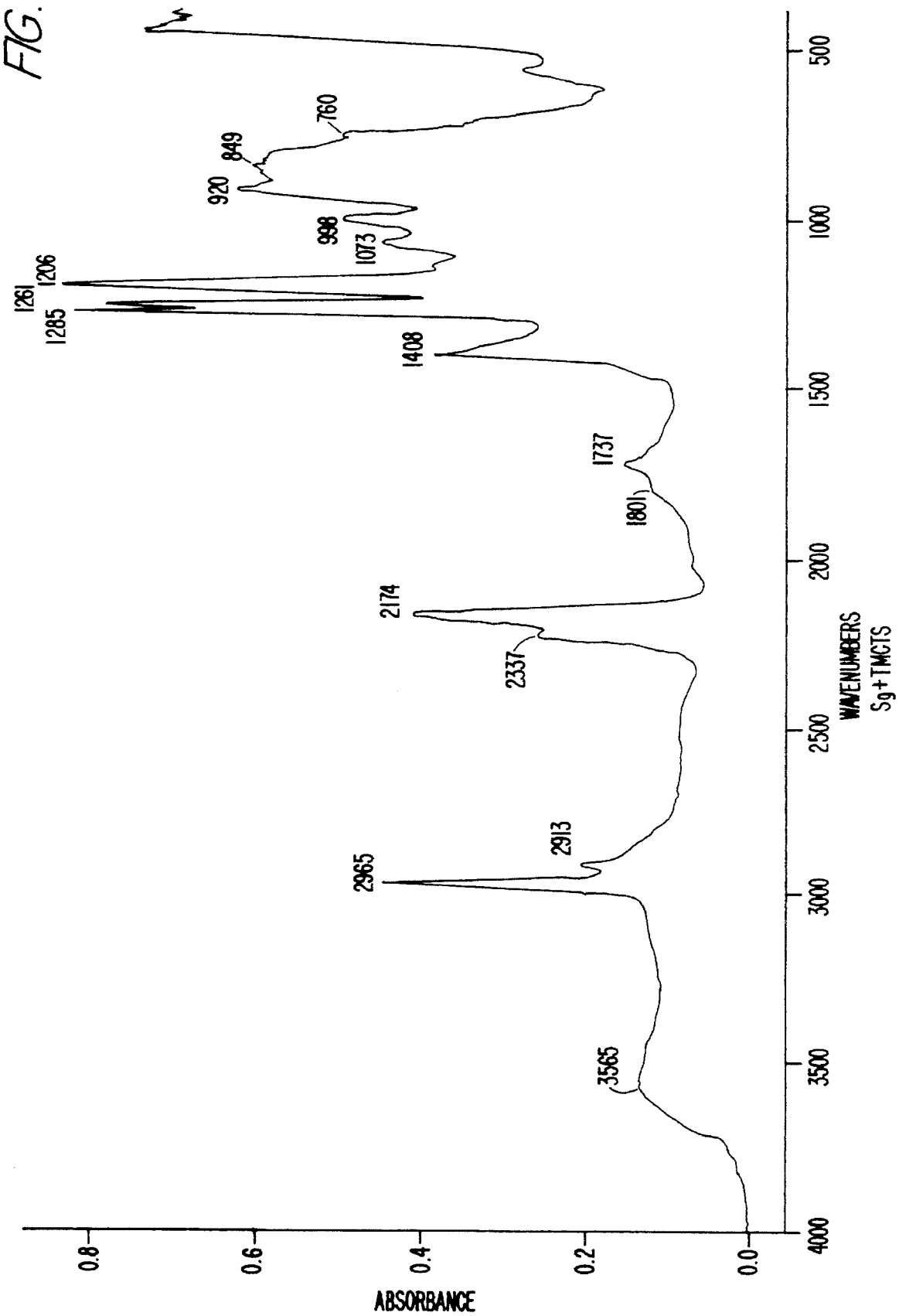
FIG. 8 depicts a FTIR spectrum of plasma copolymerized membrane made from TMCTS monomer and sulfur dioxide ($SO_2$) gas.
Figure 9A:
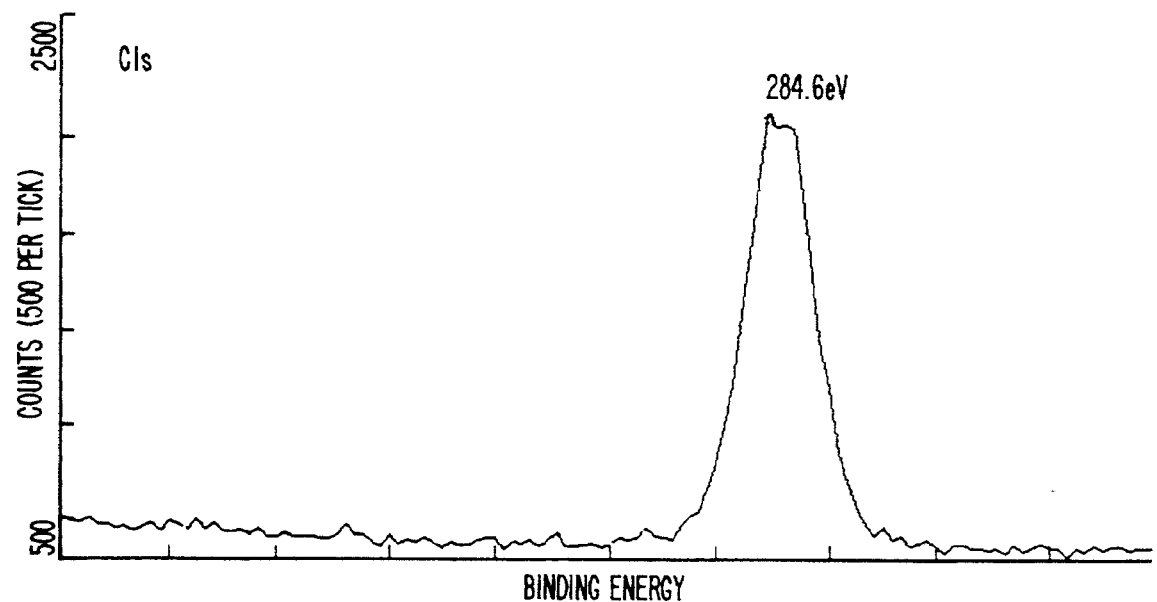
FIGS. 9A to 9C depict Electron Spectroscopy for Chemical Analysis (ESCA) Spectra of TMCTS plasma polymerized membrane.
Figure 9B:
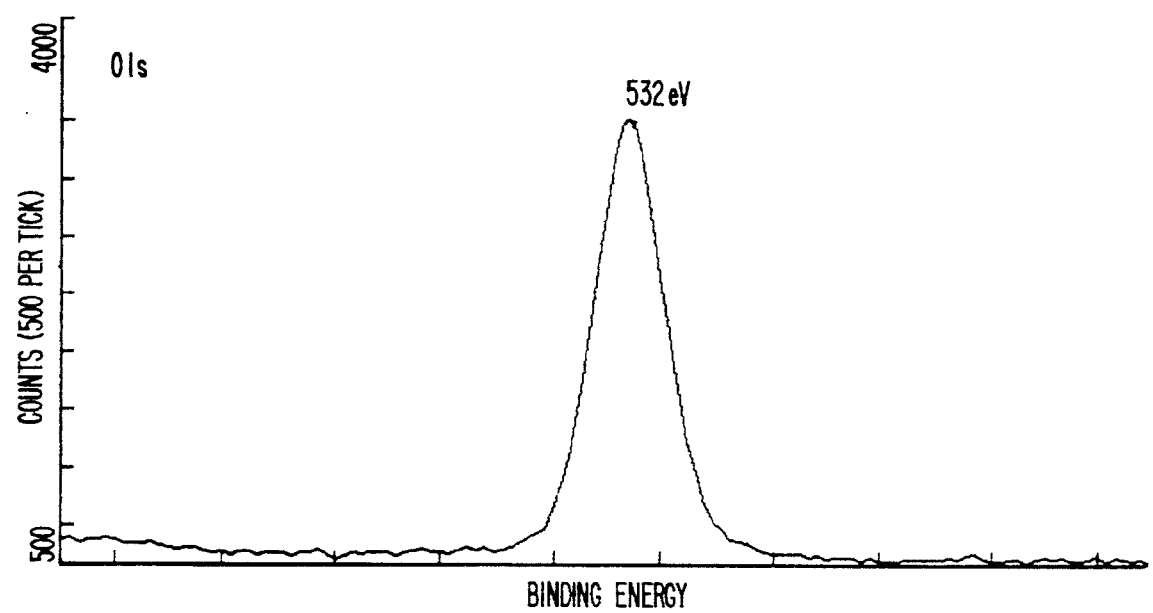
Figure 9C:
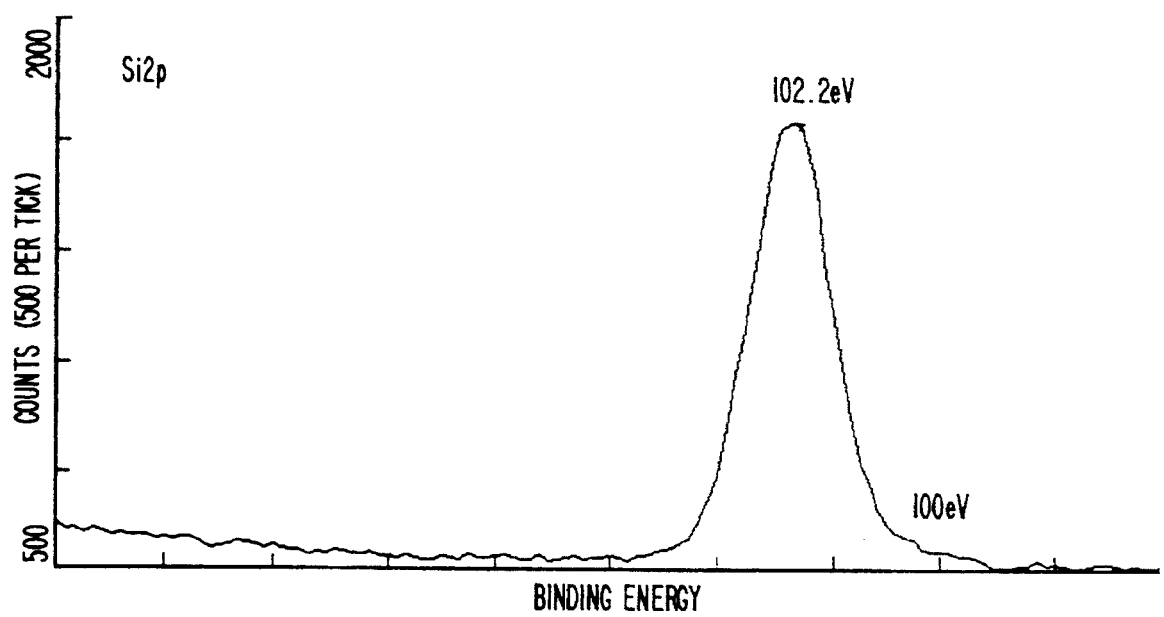
Figure 10A:
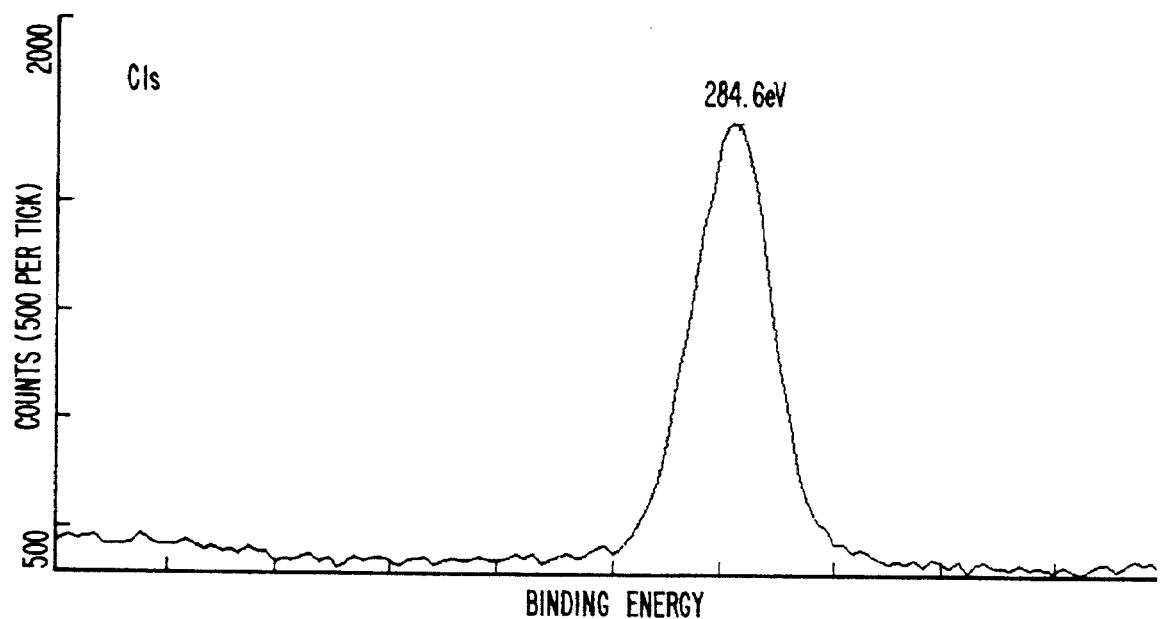
FIGS. 10A to 10C depict ESCA spectra for XMCXS plasma polymerized membrane.
Figure 10B:
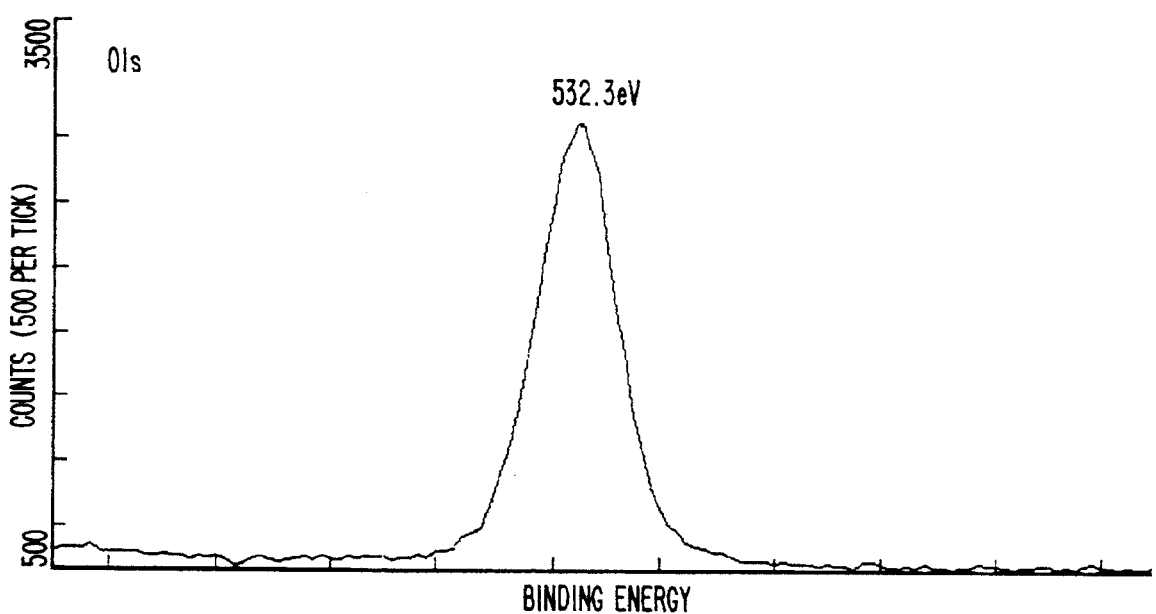
Figure 10C:
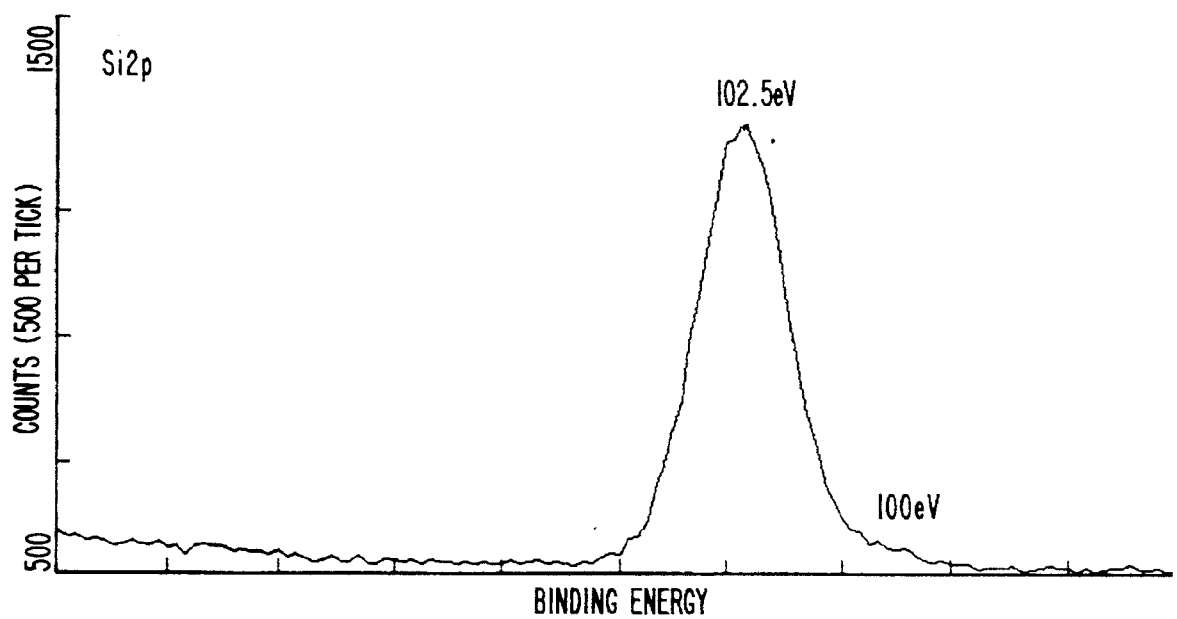
Figure 11A:
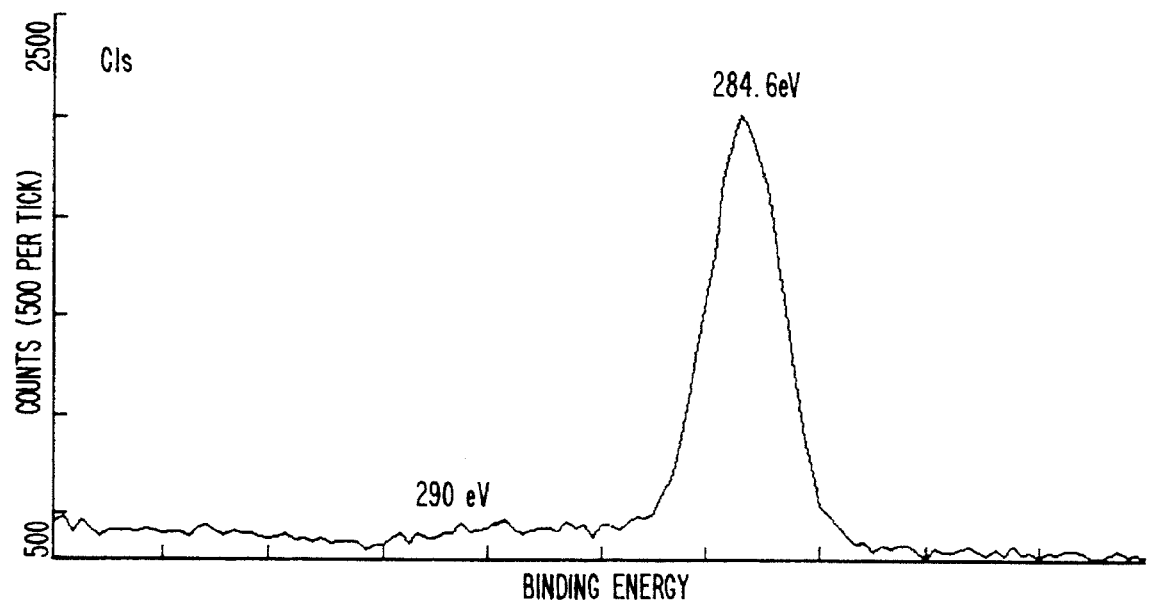
FIGS. 11A to 11d depict ESCA spectra of plasma copolymerized membrane made from TMCTS monomer and hexafluoropropylene gas.
Figure 11B:
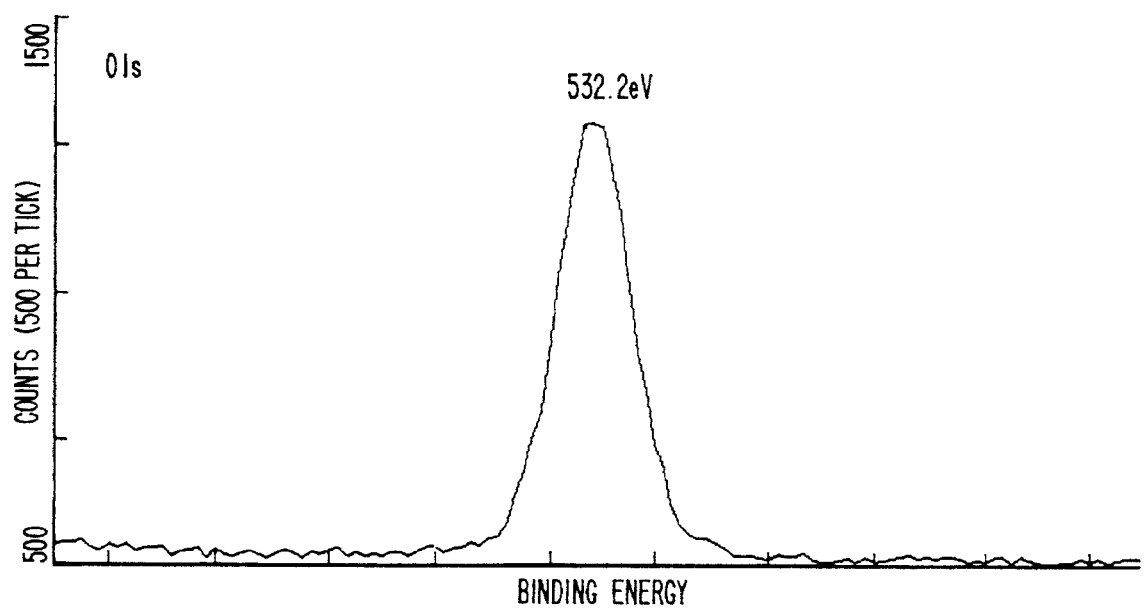
Figure 11C:
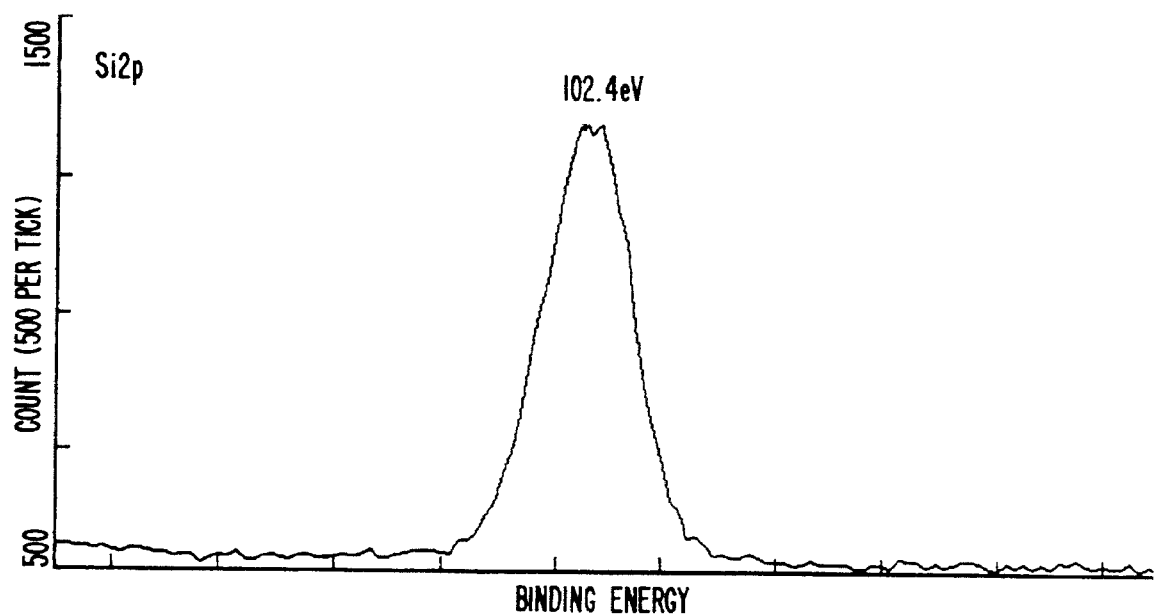
Figure 11D:
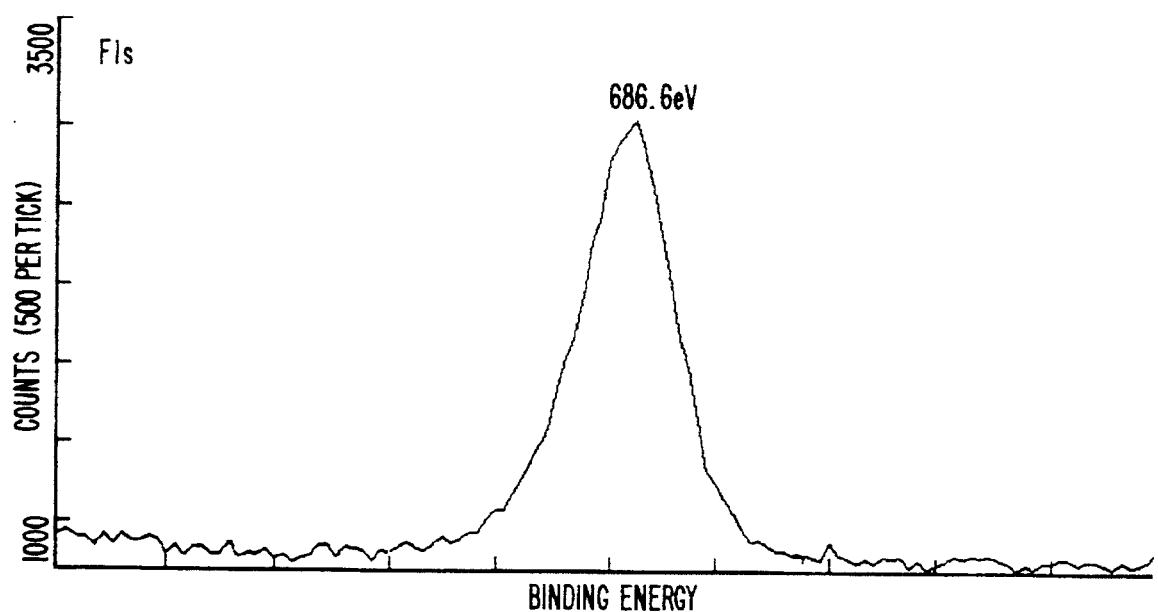
Figure 12A:
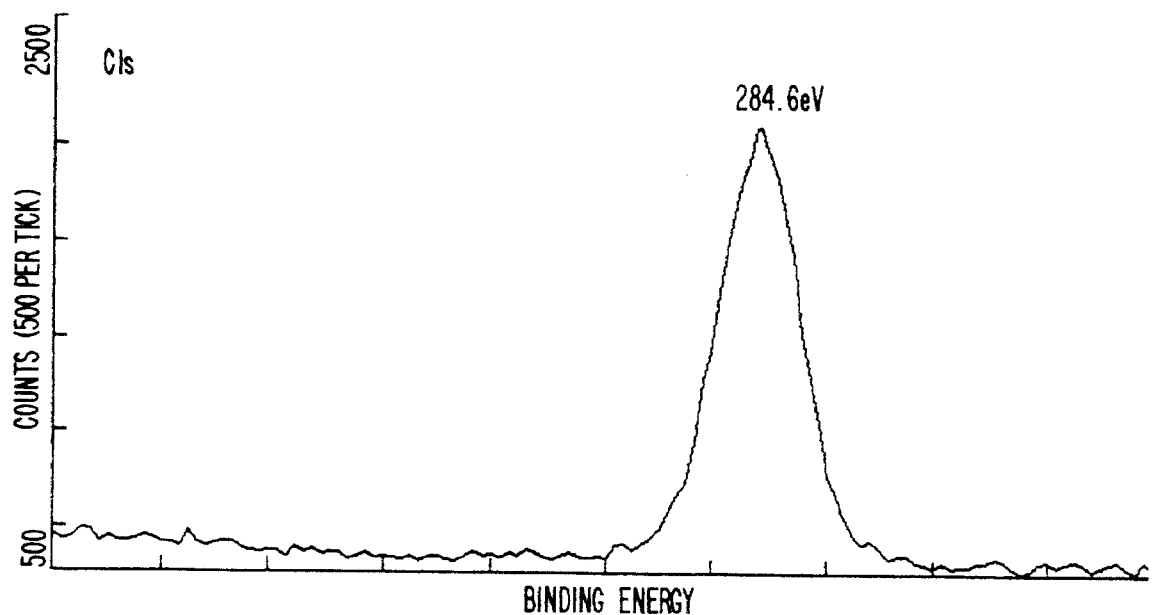
FIGS. 12A to 12C depict ESCA spectra of plasma polymerized membrane made from TMCTS monomer and ethylene gas.
Figure 12B:
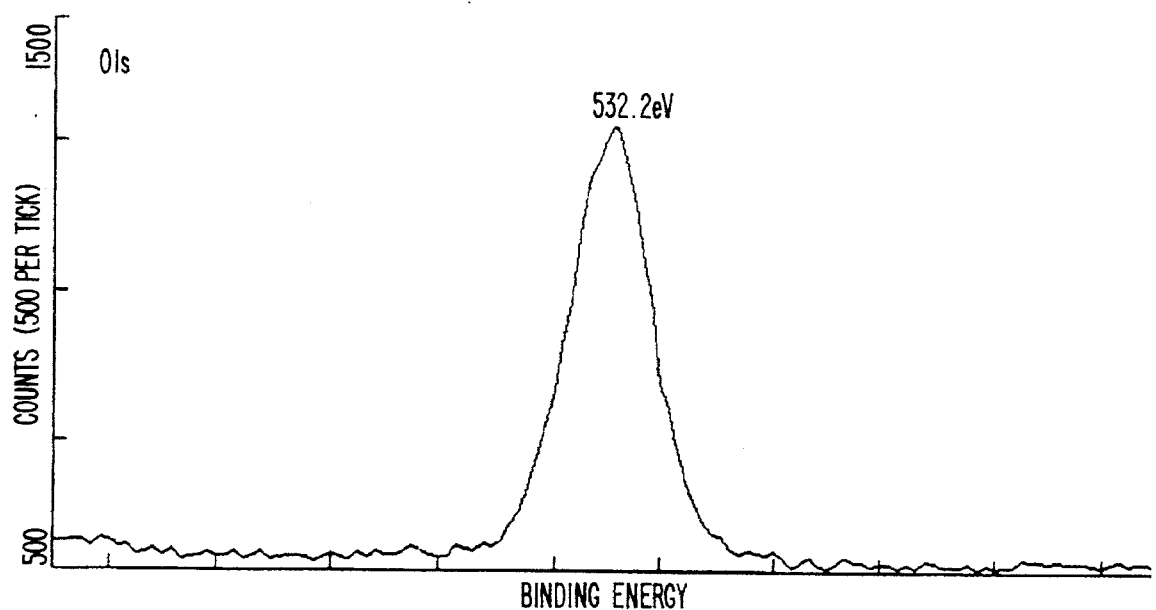
Figure 12C:
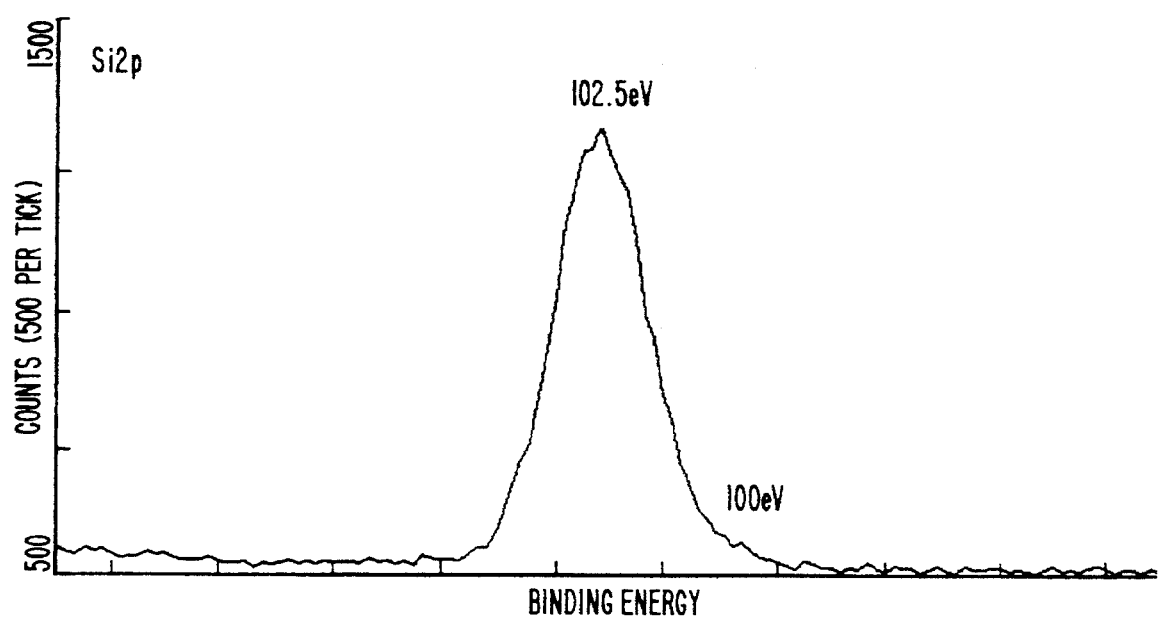

12. A composition of claim 11, wherein n is 7 to 10.
13. A composition of claim 11, wherein n is 4 to 6.
14. A composition of claim 11, wherein n is 2 to 3.
15. A composition of claim 11, wherein said hydrocyclosiloxane monomer is selected from the group consisting of 1,3,5,7-tetramethylhydrocyclotetrasiloxane, 1,3,5,7,9-pentamethylhydrocyclopentasiloxane, 1,3,5,7,9,11-hexamethylhydrocyclohexasiloxane, and a mixture of 1,3,5,7,9-pentamethylcyclopentasiloxane and 1,3,5,6,9,11-hexamethylcyclohexasiloxane monomers.
16. A composition of claim 11, wherein said hydrocyclosiloxane is selected from the group consisting of 1,3,5,7-tetramethylhydrocyclotetrasiloxane, 1,3,5,7,9-pentamethylhydrocyclopentasiloxane, 1,3,5,7,9,11-hexamethylhydrocyclohexasiloxane, and a mixture of 1,3,5,7,9-pentamethylcyclopentasiloxane and 1,3,5,6,9,11-hexamethylcyclohexasiloxane monomers and said co-monomer is hexafluoropropylene.
17. A composition of claim 11, wherein said hydrocyclosiloxane is selected from the group consisting of 1,3,5,7-tetramethylhydrocyclotetrasiloxane, 1,3,5,7,9-pentamethylhydrocyclopentasiloxane, 1,3,5,7,9,11-hexamethylhydrocyclohexasiloxane, and a mixture of 1,3,5,7,9-pentamethylcyclopentasiloxane and 1,3,5,6,9,11-hexamethylcyclohexasiloxane monomers and said co-monomer is ethylene.
18. A composition of claim 11, wherein said hydrocyclosiloxane is selected from the group consisting of 1,3,5,7-tetramethylhydrocyclotetrasiloxane, 1,3,5,7,9-pentamethylhydrocyclopentasiloxane, 1,3,5,7,9,11-hexamethylhydrocyclohexasiloxane, and a mixture of 1,3,5,7,9-pentamethylcyclopentasiloxane and 1,3,5,6,9,11-hexamethylcyclohexasiloxane monomers and said co-monomer is N-trimethylsilylallylamine.
19. A composition of claim 11, wherein said hydrocyclosiloxane is selected from the group consisting of 1,3,5,7-tetramethylhydrocyclotetrasiloxane, 1,3,5,7,9-pentamethylhydrocyclopentasiloxane, 1,3,5,7,9,11-hexamethylhydrocyclohexasiloxane, and a mixture of 1,3,5,7,9-pentamethylcyclopentasiloxane and 1,3,5,6,9,11-hexamethylcyclohexasiloxane monomers and said co-monomer is selected from the group consisting of $NH_3$, $SO_2$, $N_2$, or $CO_2$.
20. A composition of claim 15, wherein said membrane has a FTIR spectra substantially as depicted in FIGS. 3B or 4.
21. A composition in claim 16, wherein said membrane has a FTIR spectra substantially as depicted in FIG. 5.
22. A composition of claim 17, wherein said membrane has a FTIR spectra substantially as depicted in FIG. 6.
23. A composition of claim 18, wherein said membrane has a FTIR spectra substantially as depicted in FIG. 7.
24. A composition of claim 19, wherein said membrane has a FTIR spectra substantially as depicted in FIG. 8.
25. A composition of claim 15, wherein said membrane has ESCA spectra substantially as depicted in FIGS. 9A to 9C.
26. A composition of claim 15, wherein said membrane has ESCA spectra substantially as depicted in FIGS. 10A to 10C.
27. A composition of claim 16, wherein said membrane has ESCA spectra substantially as depicted in FIGS. 11A to 11D.
28. A composition of claim 17, wherein said membrane has ESCA spectra substantially as depicted in FIGS. 12A to 12C.
29. A composition of claim 18, wherein said membrane has ESCA spectra substantially as depicted in FIGS. 13A to 13D.
30. A composition of claim 19, wherein said membrane has ESCA spectra substantially as depicted in FIGS. 14A to 14E.
31. A composition of any one of claims 1 to 10, wherein said membrane is biocompatible.
32. A composition of any one of claims 11 to 30, wherein said membrane is biocompatible.
33. A composition of any one of claims 1 to 10, wherein said membrane is gas permeable.
34. A composition of claim 25 or 26 wherein said membrane has an oxygen permeation rate from 0.4 to 20, $CO_2$ permeation rate from 1 to 50 ($X10^{-4}$ $cm^3/cm^2 * sec * cmHg$) and $CO_2/O_2$ selectivity between 1.5 and 7.
35. A composition of any one of claims 11 to 30, wherein said membrane is gas permeable.
36. A composition of any one of claims 1 to 10, wherein said membrane is thromboresistant.
37. A composition of any one of claims 11 to 30, wherein said membrane is thromboresistant.

* * * * *